US009982591B2

(12) United States Patent
Nishioka et al.

(10) Patent No.: US 9,982,591 B2
(45) Date of Patent: May 29, 2018

(54) ENGINE

(71) Applicant: YANMAR CO., LTD., Osaka-shi, Osaka (JP)

(72) Inventors: Takaaki Nishioka, Osaka (JP); Hirofumi Yukawa, Osaka (JP); Hiroki Tanaka, Osaka (JP); Kenya Onishi, Osaka (JP)

(73) Assignee: Yanmar Co., Ltd., Osaka-shi, Osaka (JP)

( * ) Notice: Subject to any disclaimer, the term of this patent is extended or adjusted under 35 U.S.C. 154(b) by 102 days.

(21) Appl. No.: 15/031,720

(22) PCT Filed: Oct. 22, 2014

(86) PCT No.: PCT/JP2014/078019
§ 371 (c)(1),
(2) Date: Apr. 22, 2016

(87) PCT Pub. No.: WO2015/060321
PCT Pub. Date: Apr. 30, 2015

(65) Prior Publication Data
US 2016/0265423 A1    Sep. 15, 2016

(30) Foreign Application Priority Data

Oct. 25, 2013  (JP) ................................ 2013-222805
Oct. 25, 2013  (JP) ................................ 2013-222806

(51) Int. Cl.
*F02D 23/00*    (2006.01)
*F01N 1/00*    (2006.01)
(Continued)

(52) U.S. Cl.
CPC ............ *F02B 37/22* (2013.01); *F01N 13/107* (2013.01); *F02B 37/004* (2013.01);
(Continued)

(58) Field of Classification Search
CPC ...... F02B 37/22; F02B 37/004; F02B 37/013; F02B 37/025; F01N 13/07; F01N 2240/02;
(Continued)

(56) References Cited

U.S. PATENT DOCUMENTS 2,660,031 A * 11/1953 Tromel ................... F01N 13/10
60/323
2,773,348 A * 12/1956 Emil ....................... F02B 37/22
60/612

(Continued)

FOREIGN PATENT DOCUMENTS

DE    10 2005 021172 A1    11/2006
DE    102006022182 A1 *  11/2007 .............. F02B 37/22
(Continued)

OTHER PUBLICATIONS

A Machine Translation of a reference to Omote Hiroshi (Pub. No. JP-2001-164934 A), pubhished on Jun. 19, 2001.*
(Continued)

*Primary Examiner* — Thai Ba Trieu
(74) *Attorney, Agent, or Firm* — Sterne, Kessler, Goldstein & Fox P.L.L.C.

(57) ABSTRACT

An object is to provide an engine in which the exhaust manifolds capable of switching a dynamic pressure supercharging method and a static pressure supercharging method can be easily changed to the exhaust manifolds only of the dynamic pressure supercharging method or only of the static pressure supercharging method without replacing exhaust manifolds themselves. In an engine in which a plurality of independent exhaust manifolds is respectively connected to a supercharger, end parts of the exhaust manifolds are coupled to each other by one or more coupling pipes, an on/off valve that brings the exhaust manifolds into an independent state is provided each of in the coupling pipes, (Continued)

and the coupling pipe is configured such that a part including the on/off valve or the on/off valve is detachable from the exhaust manifolds.

2 Claims, 18 Drawing Sheets

(51) Int. Cl.
  *F16L 43/00* (2006.01)
  *F16L 23/00* (2006.01)
  *F02B 37/22* (2006.01)
  *F01N 13/10* (2010.01)
  *F02B 37/00* (2006.01)
  *F02B 37/013* (2006.01)
  *F02B 37/02* (2006.01)

(52) U.S. Cl.
  CPC .......... *F02B 37/013* (2013.01); *F02B 37/025* (2013.01); *F01N 2240/36* (2013.01); *F01N 2590/02* (2013.01); *Y02T 10/144* (2013.01)

(58) Field of Classification Search
  CPC ............ F01N 2240/20; F01N 2240/36; F01N 2590/02; F01N 13/1844; F01N 13/185; F01N 13/1855; Y02T 10/144
  USPC ................ 60/602, 322–324; 285/135.1, 414
  See application file for complete search history.

(56) References Cited

U.S. PATENT DOCUMENTS

| | | | | |
|---|---|---|---|---|
| 2,852,910 | A * | 9/1958 | Wolfram | F01N 13/10 60/323 |
| 3,077,071 | A * | 2/1963 | Leichtfuss | F02B 37/02 60/323 |
| 3,180,077 | A * | 4/1965 | Berchtold | F02B 37/00 60/323 |
| 4,159,627 | A * | 7/1979 | Monch | F01N 13/10 60/323 |
| 4,207,742 | A | 6/1980 | Dommes et al. | |
| 5,463,867 | A * | 11/1995 | Ruetz | F01N 13/107 60/323 |
| 7,637,106 | B2 * | 12/2009 | Hertweck | F02B 37/025 60/602 |
| 7,891,345 | B2 * | 2/2011 | Pierpont | F02B 37/025 60/605.2 |
| 8,201,405 | B2 * | 6/2012 | Bruce | F01N 13/10 60/323 |
| 8,555,638 | B2 * | 10/2013 | Luft | F01N 13/107 60/323 |
| 2003/0230085 | A1 * | 12/2003 | Sumser | F02B 37/24 60/602 |
| 2006/0174621 | A1 | 8/2006 | Chen et al. | |
| 2007/0175215 | A1 | 8/2007 | Rowells | |
| 2008/0000228 | A1 * | 1/2008 | Kieser | F02B 29/0412 60/280 |
| 2009/0120087 | A1 * | 5/2009 | Sumser | F01N 13/107 60/600 |
| 2010/0011762 | A1 * | 1/2010 | Hokuto | F01N 13/107 60/602 |

FOREIGN PATENT DOCUMENTS

| | | |
|---|---|---|
| GB | 1164018 A | 9/1969 |
| JP | 54-13822 | 2/1979 |
| JP | 60-247006 A | 12/1985 |
| JP | 3074863 U | 1/2001 |
| JP | 2001-164934 A | 6/2001 |
| JP | 2004-068631 A | 3/2004 |
| JP | 2004-124749 A | 4/2004 |
| JP | 2008-038657 A | 2/2008 |

OTHER PUBLICATIONS

A Machine Translation of a reference to Hamaoka Shunji (Pub. No. JP-2008-038657 A), pubished on Feb. 21, 2008.*
Extended European Search Report issued in European Patent Application No. 14856433.9 dated May 4, 2017.
Notification of Reason for Refusal issued in Korean Patent Application No. 10-2016-7013718 dated Jun. 15, 2017.
PCT/2014/078019, International Search Report, dated Dec. 9, 2014, 4 pages.

* cited by examiner

FIG. 6
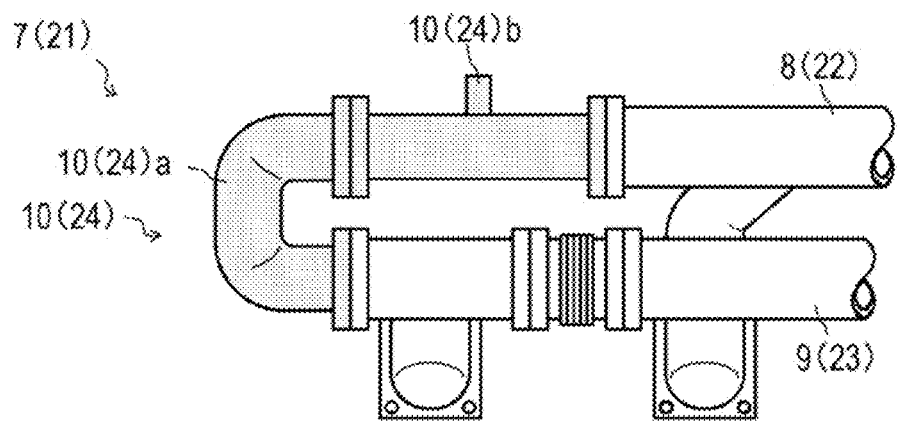
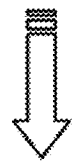
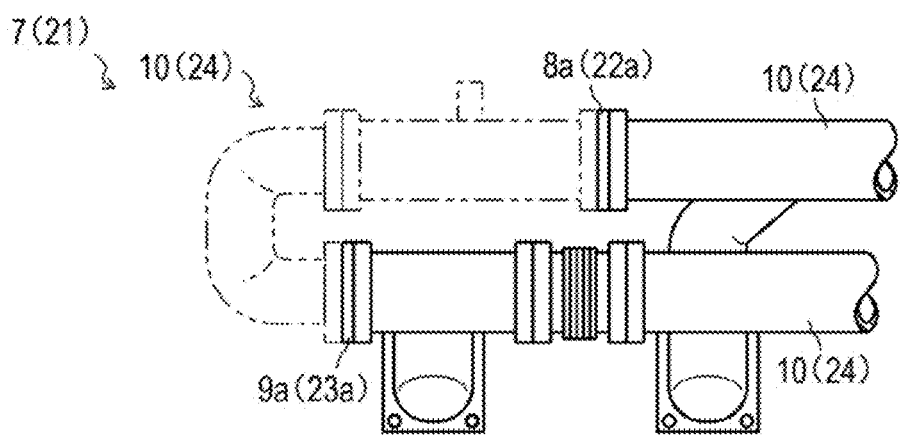

ENGINE

TECHNICAL FIELD

The present invention relates to an engine. In detail, the present invention relates to an engine with a supercharger.

BACKGROUND ART

Conventionally, in an engine with a supercharger, an engine in which independent exhaust manifolds are respectively provided in a plurality of cylinder groups each including cylinders of the same phase among cylinders, so as to perform dynamic pressure supercharging is known.

In such an engine, an engine in which exhaust manifolds communicate with each other via an on/off valve in order to improve fuel consumption in a case where the engine is in a high speed region is publicly known. This engine is configured such that dynamic pressure supercharging exhaust manifolds can be changed to static pressure exhaust manifolds by bringing the on/off valve into an opened state. Accordingly, in the engine, by providing communication between the exhaust manifolds and increasing an actual pipe diameter, fuel consumption deterioration due to thermal losses can be suppressed. For example, this is as described in Patent Document 1.

In an engine described in Patent Document 1, in order to switch dynamic pressure supercharging exhaust manifolds to static pressure supercharging exhaust manifolds, a communication pipe providing communication between the exhaust manifolds and an on/off valve are required. However, in the engine to be operated by a dynamic pressure supercharging method for most of time using the engine, the communication pipe and the on/off valve enabling switching of the dynamic pressure supercharging method and a static pressure supercharging method are disadvantageously excessive facilities and a cause for increasing cost.

PRIOR ART DOCUMENT

Patent Document

PTL1: JP 2008-038657 A

SUMMARY OF THE INVENTION

Problems to be Solved by the Invention

The present invention is achieved in consideration of the above situation, and an object thereof is to provide an engine in which without replacing exhaust manifolds themselves, the exhaust manifolds capable of switching a dynamic pressure supercharging method and a static pressure supercharging method can be easily changed to the exhaust manifolds only of the dynamic pressure supercharging method or only of the static pressure supercharging method.

Solutions to the Problems

In the present invention, in an engine in which a plurality of independent exhaust manifolds are connected to a supercharger, end parts of the exhaust manifolds are coupled to each other by one or more coupling pipes, an on/off valve that brings the exhaust manifolds into an independent state is provided in each of the coupling pipes, and the coupling pipe is configured such that a part including the on/off valve or the on/off valve is detachable from the exhaust manifolds.

In the present invention, the coupling pipes coupling the exhaust manifolds are coupled to each other via one or more branch pipes.

In the present invention, the number of the plurality of provided independent exhaust manifolds is three or more, a first reference value and a second reference value in a load factor of the engine are set depending on rotation speed of the engine, in a case where the load factor is less than the first reference value, all the on/off valves are brought into a closed state, in a case where the load factor is the first reference value or more and less than the second reference value, some of the on/off valves are brought into an opened state, and in a case where the load factor is the second reference value or more, all the on/off valves are brought into an opened state.

In the present invention, in a case where an increase/decrease amount of the load factor per unit time is a predetermined value or more, all the on/off valves are brought into a closed state, and in a case where the increase/decrease amount of the load factor per unit time becomes and is kept at less than the predetermined value for a predetermined period of time, the on/off valves are opened and closed depending on the load factor.

Effects of the Invention

As effects of the present invention, the following effects are exerted.

According to the present invention, the coupling pipe including the on/off valve or only the on/off valve is easily attached to and detached from the exhaust manifolds. Accordingly, without replacing the exhaust manifolds themselves, the exhaust manifolds capable of switching a dynamic pressure supercharging method and a static pressure supercharging method can be easily changed to the exhaust manifolds only of the dynamic pressure supercharging method or only of the static pressure supercharging method.

According to the present invention, the coupling pipe is disposed and concentrated on one side end parts of the exhaust manifolds. Accordingly, in the engine, the exhaust manifolds capable of switching the dynamic pressure supercharging method and the static pressure supercharging method can be formed with a configuration in which attachment and detachment of the coupling pipe and maintenance of the on/off valve are easily performed.

According to the present invention, a pressure state of the exhaust air supplied to the supercharger is changed based on the load factor of the engine. Accordingly, responsiveness of the supercharger at the time of low-speed rotation of the supercharger and fuel consumption of the engine at the time of high-speed rotation of the supercharger can be improved.

According to the present invention, when a load state of the engine is changed, the responsiveness of the supercharger is improved. Accordingly, generation of black smoke at the time of a transient response can be suppressed and the fuel consumption can also be improved.

BRIEF DESCRIPTION OF THE DRAWINGS

FIG. 6 is a schematic view showing a configuration where exhaust manifolds of the engine according to the first embodiment of the present invention are coupled via an on/off valve.

EMBODIMENTS OF THE INVENTION

At first, a vessel 100 serving as a first embodiment of a vessel in which an engine 1 including a supercharger 3 according to the present invention is mounted will be described with reference to FIG. 1.

Figure 1:
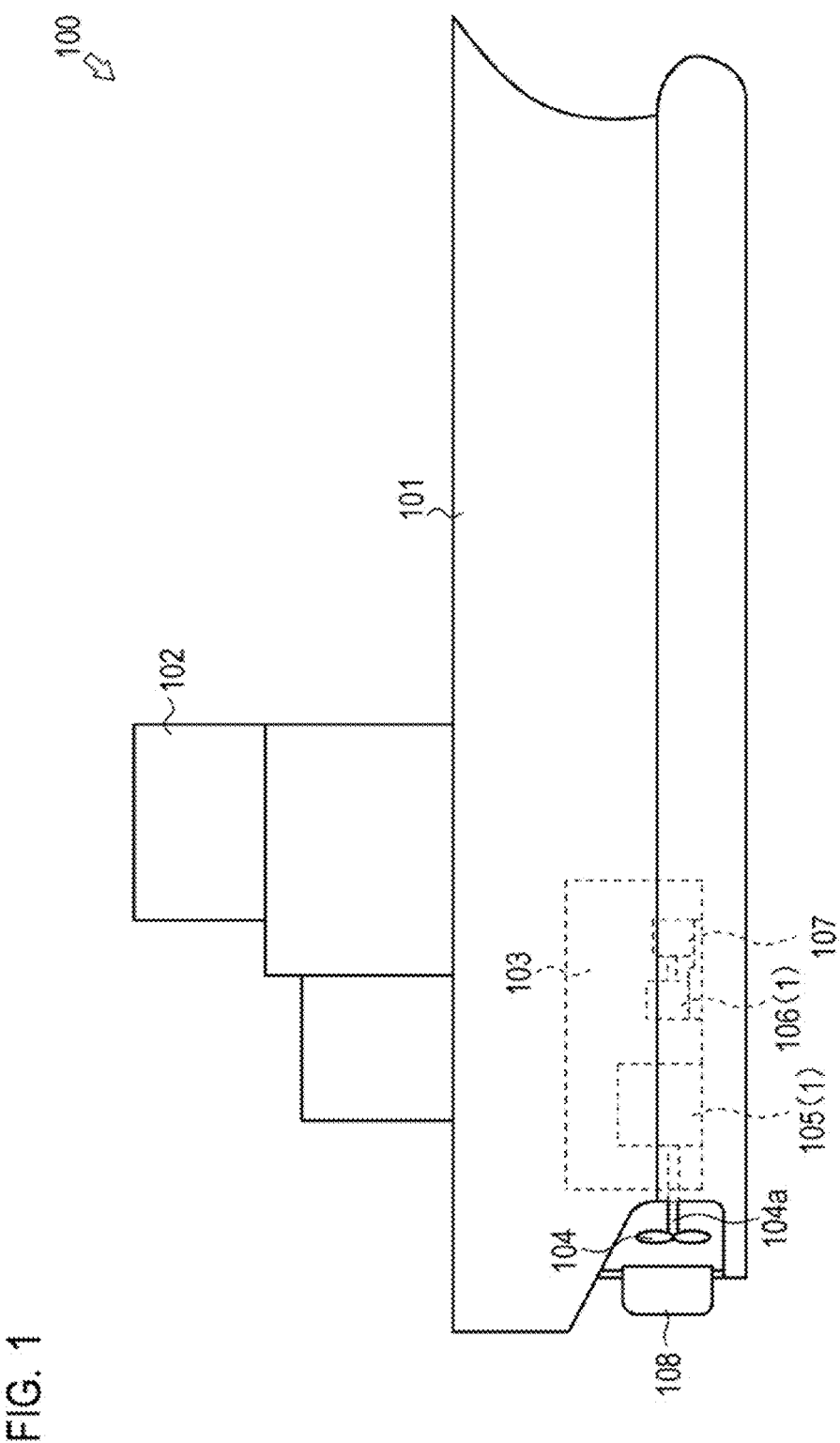
FIG. 1 is a schematic view showing a configuration of a vessel in which an engine according to a first embodiment of the present invention is mounted.

As shown in FIG. 1, the vessel 100 includes a vessel body 101, a bridge 102, an engine room 103, a propeller 104, and a helm 108. In the vessel 100, the bridge 102 having a control cabin and the like is provided in an upper part of the vessel body 101. In the vessel 100, the engine room 103 is provided in a rear part of the vessel body 101. In the engine room 103, a main engine 105 serving as an internal combustion engine that drives the propeller 104, and an auxiliary engine 106 serving as an internal combustion engine that drives a generator 107 are provided. At the stern of the vessel body 101, the propeller 104 and the helm 108 are provided. The vessel 100 is configured such that power of the main engine 105 can be transmitted to the propeller 104 via a propeller shaft 104a.

The main engine 105 and the auxiliary engine 106 are configured by the engine 1 which is a diesel engine whose fuel is light oil or heavy oil. In the engine 1, an output shaft is driven and rotated by mixing and combusting the outside air and the fuel. It should be noted that the engine 1 is not limited to the diesel engine.

Hereinafter, the engine 1 including the supercharger 3 according to the first embodiment of the present invention will be described with reference to FIGS. 2 to 5.

As shown in FIGS. 2 to 5, the engine 1 is the diesel engine, and in the present embodiment, an in-line six-cylinder engine which has six cylinders. In the present embodiment, the engine is an in-line six-cylinder engine including a single-stage supercharger. However, the present invention is not limited to this but the engine may be a multicylinder engine including one or more supercharger.

In the engine 1, the output shaft is driven and rotated by mixing and combusting the outside air and the fuel inside the cylinders. The engine 1 includes an intake device 2 that takes the outside air in, and an exhaust device 7 that discharges the exhaust air to the outside.

The intake device 2 includes a compressor portion 3a of the supercharger 3, an air supply pipe 4, an intercooler 5, and an air supply manifold 6.

The supercharger 3 is to pressurize and compress the intake air with exhaust pressure of the exhaust air as a drive source. The supercharger 3 includes the compressor portion 3a and a turbine portion 3b.

The compressor portion 3a of the supercharger 3 is to pressurize and compress the intake air. The compressor portion 3a is coupled to the turbine portion 3b by a coupling shaft 3c. The compressor portion 3a is configured such that rotation power from the turbine portion 3b can be transmitted via the coupling shaft 3c. The intercooler 5 is connected to the compressor portion 3a via the air supply pipe 4.

The intercooler 5 is to cool the pressurized intake air. By performing heat exchange between cooling water supplied by a cooling water pump (not shown) and the pressurized intake air (hereinafter, the intake air pressurized and compressed by the compressor portion 3a will be referred to as the supplied air), the intercooler 5 cools the supplied air. The air supply manifold 6 is connected to the intercooler 5.

The air supply manifold 6 is to distribute the supplied air to the cylinders of the engine 1. The air supply manifold 6 is connected to the cylinders of the engine 1. The air supply manifold 6 is configured such that the supplied air cooled in the intercooler 5 can be supplied to the cylinders of the engine 1.

The exhaust device 7 includes exhaust manifolds 8, 9, and the turbine portion 3b of the supercharger 3.

Regarding the exhaust manifolds 8, 9, the exhaust manifolds 8, 9 are respectively independently connected to two cylinder groups including cylinders of the same phase of the engine 1 (a group of first, fourth, and fifth cylinders, and a group of second, third, and sixth cylinders in the present embodiment). That is, the exhaust manifold 8 discharges the exhaust air from the first, fourth, and fifth cylinders together, and the exhaust manifold 9 discharges the exhaust air from the second, third, and sixth cylinders together.

A coupling pipe 10 (refer to a hatched part in FIG. 6) is detachably coupled to end parts (one side end parts) of the exhaust manifolds 8, 9. The supercharger 3 is connected to the other side end parts of the exhaust manifolds 8, 9.

The coupling pipe 10 includes a bent pipe 10a, an on/off valve 10b, and an extension pipe 10c. The coupling pipe 10 is detachable from the exhaust manifolds 8, 9. With such a configuration, the coupling pipe 10 is formed so as to couple the independent exhaust manifolds 8, 9 to each other.

With such a configuration, the one side end parts of the exhaust manifolds 8, 9 are coupled to each other by the coupling pipe 10. That is, since the coupling pipe 10 is disposed to the one side end parts of the exhaust manifolds 8, 9, in the exhaust device 7, the exhaust manifolds 8, 9 capable of switching a dynamic pressure supercharging method and a static pressure supercharging method can be formed with a configuration in which attachment and detachment of the coupling pipe 10 and maintenance of the on/off valve 10b are easily performed.

The turbine portion 3b of the supercharger 3 is to generate the rotation power by the pressure of the exhaust air. The turbine portion 3b is coupled to the compressor portion 3a by the coupling shaft 3c, and is configured such that the rotation power can be transmitted to the compressor portion 3a. The exhaust manifolds 8, 9 are connected to the turbine portion 3b. The turbine portion 3b communicates with the outside via a purifying device (not shown) or the like.

As described above, in the intake device 2, the compressor portion 3a of the supercharger 3, the air supply pipe 4, the intercooler 5, and the air supply manifold 6 are connected in order from the upstream side (outside). In the exhaust device 7, the exhaust manifolds 8, 9, the turbine portion 3b of the supercharger 3, and an exhaust pipe or the like (not shown) are connected in order from the upstream side (engine 1).

Next, arrangement of the supercharger 3, the air supply pipe 4, the intercooler 5, the air supply manifold 6, and the exhaust manifolds 8, 9 with respect to the engine 1 according to the first embodiment of the present invention will be described.

Figure 3:
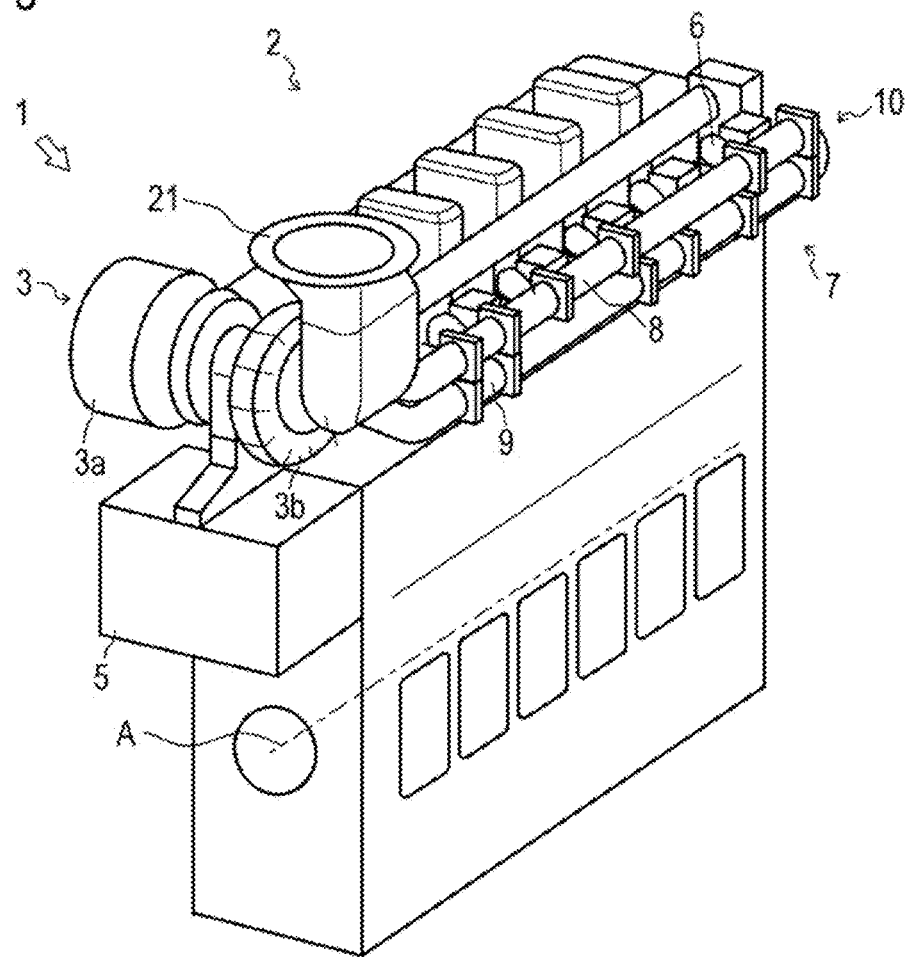
FIG. 3 is a perspective view showing the engine according to the first embodiment of the present invention.
Figure 4:
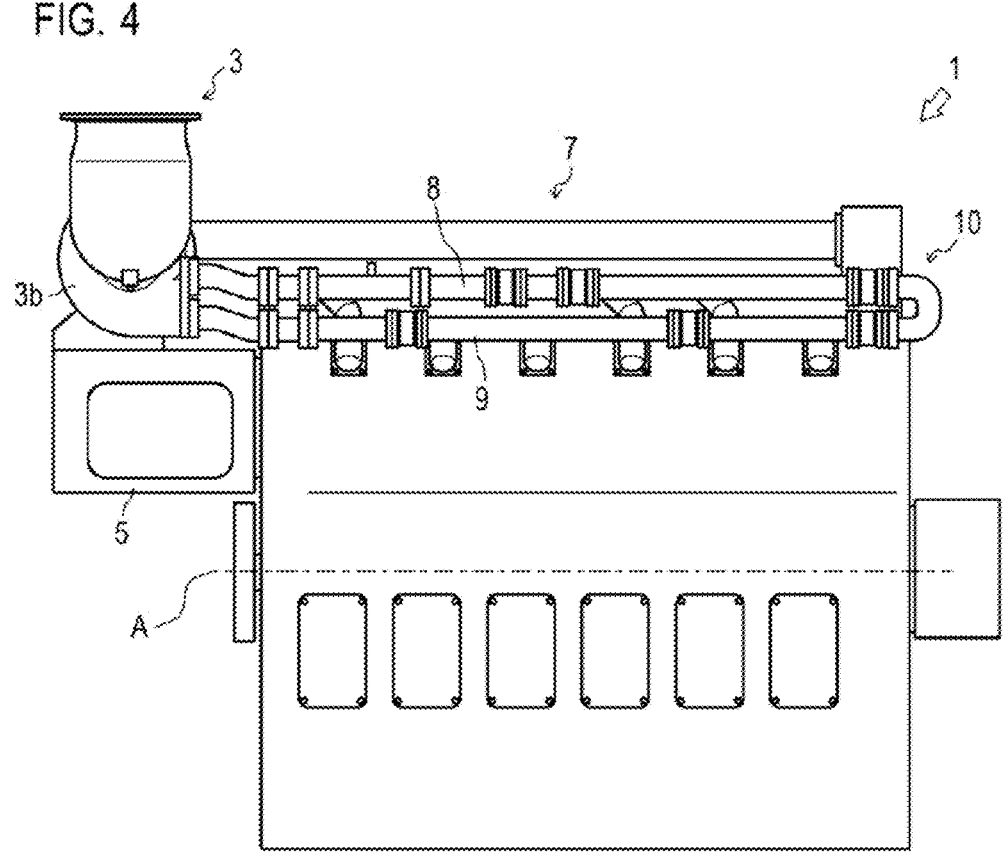
FIG. 4 is a side view showing the engine according to the first embodiment of the present invention.
Figure 5:
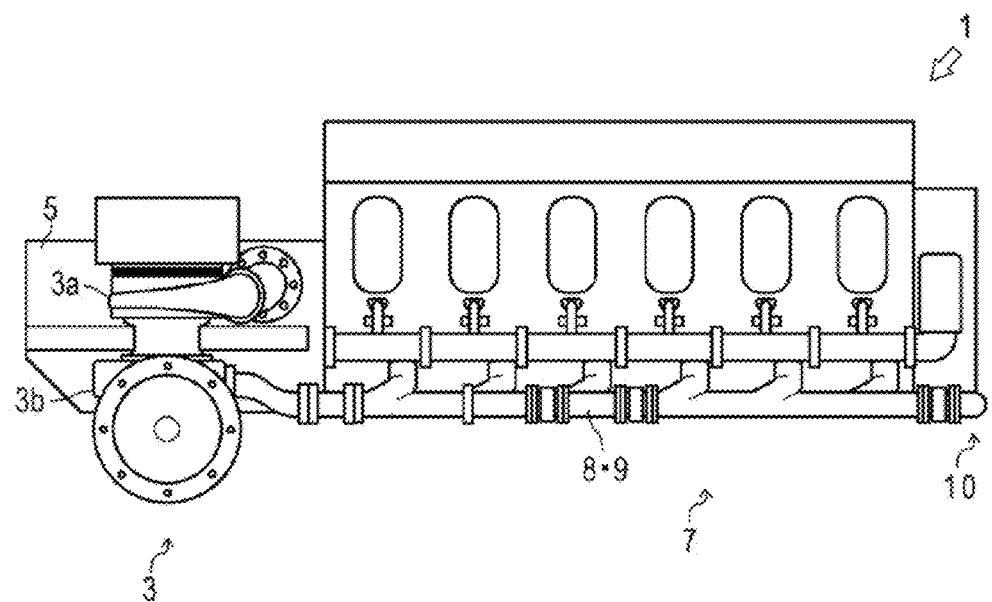
FIG. 5 is a plan view showing the engine according to the first embodiment of the present invention.

As shown in FIGS. 3 to 5, the intercooler 5 is fixed to a side surface in one side end part in the axial direction of an output axis A of the engine 1. The supercharger 3 is fixed to an upper part of the intercooler 5. That is, in the engine 1, the supercharger 3 and the intercooler 5 are disposed in the one side end part in the axial direction of the output axis A.

The air supply manifold 6 is formed in an engine block of the engine 1 on one side of the direction orthogonal to the output axis A on a horizontal plane. The air supply manifold 6 is configured so as to communicate with the intercooler 5 fixed to the side surface in the one side end part of the engine 1. The exhaust manifolds 8, 9 are disposed on the other side of the direction orthogonal to the output axis A of the engine 1 on the horizontal plane. The exhaust manifold 9 is disposed in line with the exhaust manifold 8 on the lower side of the exhaust manifold 8.

Next, a flow of the intake air in the intake device 2 and a flow of the exhaust air in the exhaust device 7 will be described with reference to FIG. 2.

Figure 2:
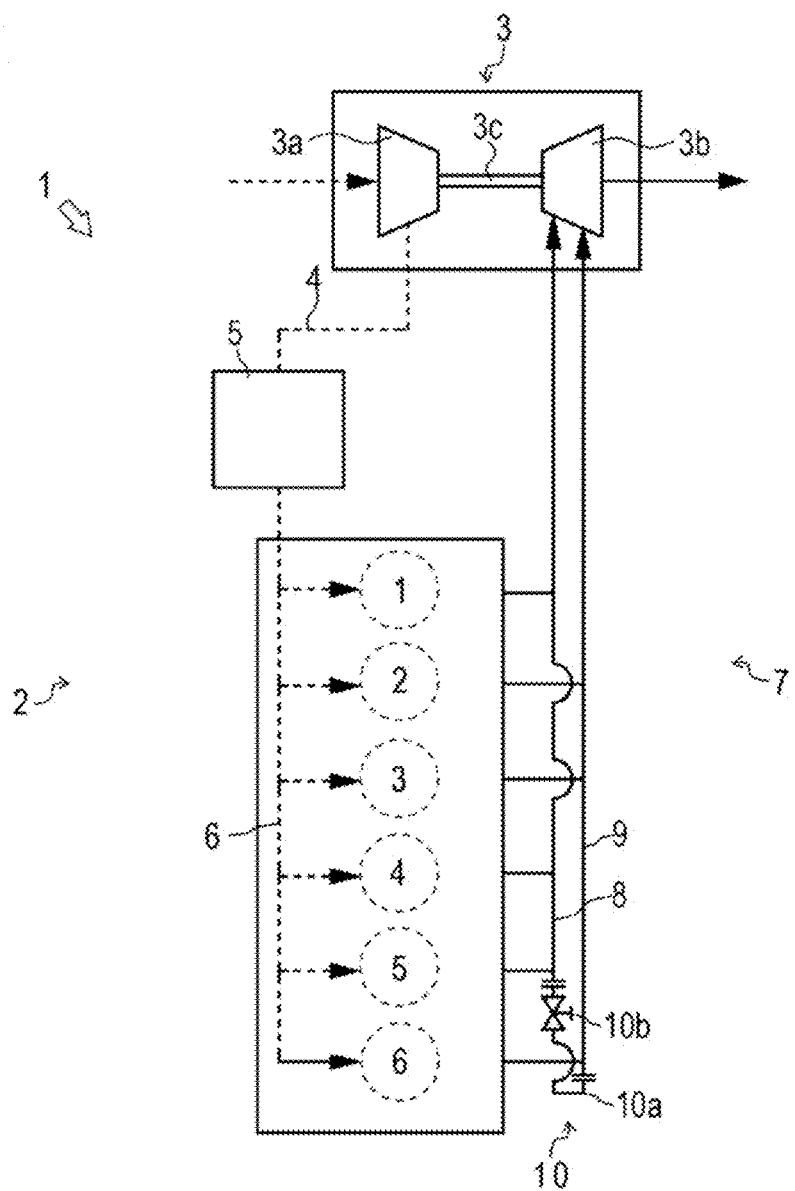
FIG. 2 is a schematic view showing a configuration of the engine and a supercharger according to the first embodiment of the present invention.

As shown in FIG. 2, in the intake device 2, the outside air (intake air) is taken in, pressurized, and compressed by the compressor portion 3a of the supercharger 3. At this time, by pressurization and compression of the intake air, compression heat is generated and a temperature is increased. The intake air pressurized and compressed in the compressor portion 3a is discharged from the supercharger 3.

The intake air discharged from the supercharger 3 is supplied to the intercooler 5 via the air supply pipe 4. The intake air supplied to the intercooler 5 is cooled and then supplied to the engine 1 via the air supply manifold 6.

In the exhaust device 7, the exhaust air from the engine 1 is supplied to the turbine portion 3b of the supercharger 3 via the exhaust manifold 8 and the exhaust manifold 9. The turbine portion 3b is rotated by the exhaust air. The rotation power of the turbine portion 3b is transmitted to the compressor portion 3a via the coupling shaft 3c. The exhaust air supplied to the turbine portion 3b is discharged to the outside via the purifying device (not shown) or the like.

Figure 7:
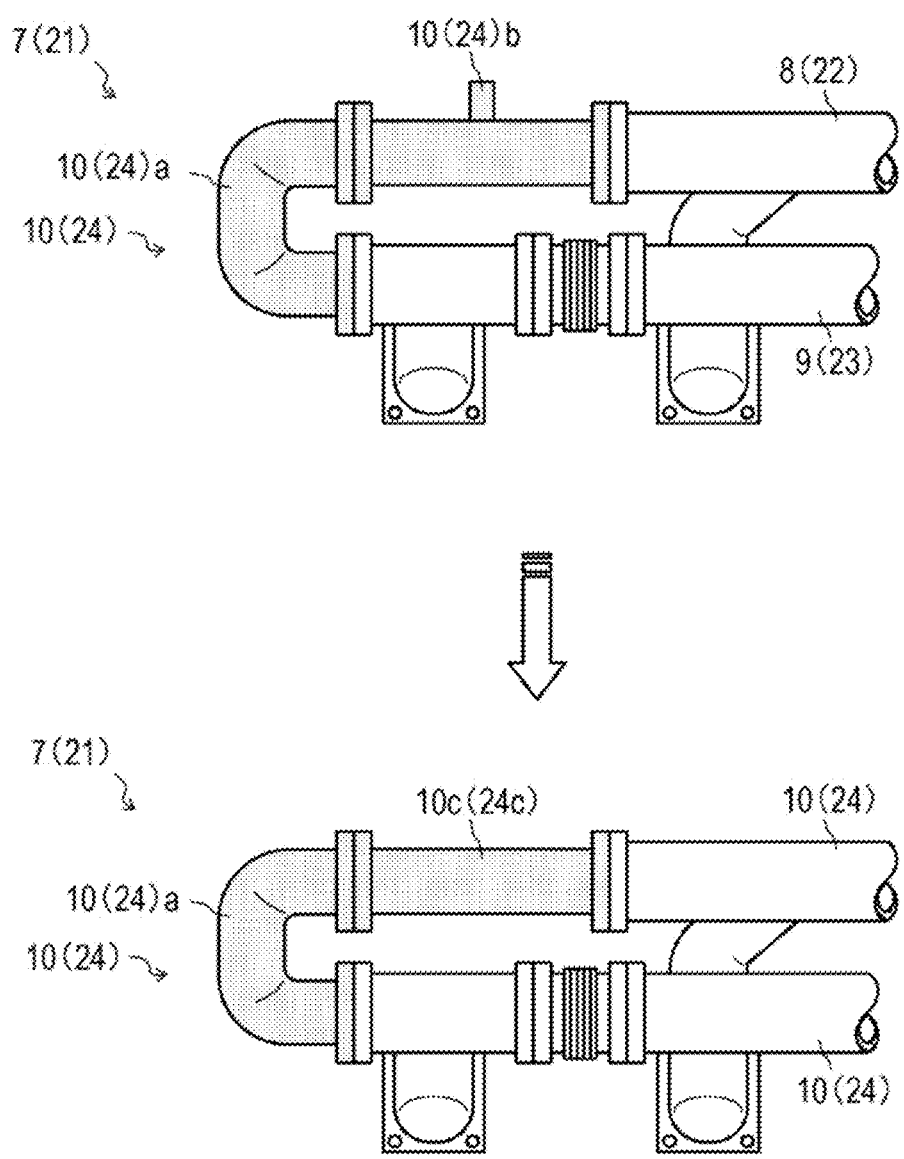
FIG. 7 is a schematic view showing a configuration where the exhaust manifolds of the engine according to the first embodiment of the present invention are coupled.

Hereinafter, the exhaust manifolds 8, 9 and the coupling pipe 10 of the engine 1 according to the first embodiment of the present invention will be specifically described with reference to FIGS. 6 and 7. FIGS. 6 and 7 represent one side parts of the exhaust manifolds 8, 9 of the engine 1.

As shown in FIGS. 6 and 7, the coupling pipe 10 (hatched part) is detachably coupled to the end parts (one side end parts) of the exhaust manifolds 8, 9, the end parts on the opposite side of the supercharger 3. The supercharger 3 is connected to the other side end parts of the exhaust manifolds 8, 9 (refer to FIGS. 2 to 5).

The coupling pipe 10 is to couple the exhaust manifold 8 and the exhaust manifold 9. The coupling pipe 10 includes the bent pipe 10a, the on/off valve 10b, or the extension pipe 10c. The coupling pipe 10 is detachable from the one side end parts of the exhaust manifolds 8, 9. The coupling pipe 10 is formed so as to switch whether or not the exhaust manifold 8 and the exhaust manifold 9 communicate with each other by a state of the on/off valve 10b.

As shown in FIG. 6, regarding the exhaust manifold 8 and the exhaust manifold 9, one side end part of the bent pipe 10a is coupled to the one side end part of the exhaust manifold 9, and the one side end part of the exhaust manifold 8 is coupled to the other side end part of the bent pipe 10a via the on/off valve 10b. As shown in FIG. 7, the coupling pipe 10 is configured such that the extension pipe 10c can be connected instead of the on/off valve 10b. Accordingly, the coupling pipe 10 is formed so as to couple the exhaust manifold 8 and the exhaust manifold 9 without the on/off valve 10b.

In the exhaust device 7, in a case where the on/off valve 10b of the coupling pipe 10 is brought into a closed state, the exhaust manifold 8 and the exhaust manifold 9 are independently connected to the second turbine portion 3b of the supercharger 3. That is, in the exhaust device 7, the exhaust manifolds corresponding to the dynamic pressure supercharging method are formed. In the exhaust device 7, in a case where the on/off valve 10b is brought into an opened state, the exhaust manifold 8 and the exhaust manifold 9 are connected to the turbine portion 3b of the supercharger 3 in a state where the exhaust manifolds communicate with each other. That is, in the exhaust device 7, the exhaust manifolds 8, 9 corresponding to the static pressure supercharging method are formed.

As shown in FIG. 6, in a case where the exhaust air is supplied to the supercharger 3 only by dynamic pressure supercharging, the coupling pipe 10 is removed from the exhaust manifolds 8, 9 in the exhaust device 7. At this time, the one side end parts of the exhaust manifolds 8, 9 are sealed by lids 8a, 9a, respectively. Accordingly, in the exhaust device 7, the exhaust manifold 8 and the exhaust manifold 9 are connected to the supercharger 3 in a state where the exhaust manifolds are independent from each other. That is, in the exhaust device 7, the exhaust manifolds 8, 9 corresponding only to the dynamic pressure supercharging method are formed.

As shown in FIG. 7, in a case where the exhaust air is supplied to the supercharger 3 only by static pressure supercharging, the on/off valve 10b is removed from the coupling pipe 10 and instead, the extension pipe 10c is attached in the exhaust device 7. Accordingly, in the exhaust device 7, the exhaust manifold 8 and the exhaust manifold 9 are connected to the supercharger 3 in a state where the exhaust manifolds communicate with each other. That is, in the exhaust device 7, the exhaust manifolds 8, 9 corresponding only to the static pressure supercharging method are formed.

As described above, in the engine 1 according to the first embodiment of the present invention, the one side end part of the exhaust manifold 8 and the one side end part of the exhaust manifold 9 are coupled by the coupling pipe 10. In the engine 1, the coupling pipe 10 including the on/off valve 10b or only the on/off valve 10b is easily attached to and detached from the exhaust manifolds 8, 9. Accordingly, without replacing the exhaust manifolds 8, 9, the exhaust manifolds 8, 9 capable of switching the dynamic pressure supercharging method and the static pressure supercharging method can be easily changed to the exhaust manifolds 8, 9 only of the dynamic pressure supercharging method or only of the static pressure supercharging method.

Hereinafter, an engine 11 including a first supercharger 13 and a second supercharger 17 according to a second embodiment of the present invention will be described with reference to FIGS. 8 to 11.

As shown in FIGS. 8 to 11, the engine 11 is a diesel engine, and in the present embodiment, an in-line six-cylinder engine which has six cylinders. In the present embodiment, the engine is an in-line six-cylinder engine including a two-stage supercharger. However, the present invention is not limited to this but the engine may be a multicylinder engine including one or more supercharger.

In the engine 11, an output shaft is driven and rotated by mixing and combusting the outside air and fuel inside the cylinders. The engine 11 includes an intake device 12 that takes the outside air in, and an exhaust device 21 that discharges the exhaust air to the outside.

The intake device 12 includes a first compressor portion 13a of the first supercharger 13, air supply pipes 14, 16, 18, a low pressure side intercooler 15, a second compressor portion 17a of the second supercharger 17, a high pressure side intercooler 19, and an air supply manifold 20.

The first supercharger 13 serving as a low pressure stage supercharger is to pressurize and compress the intake air with exhaust pressure of the exhaust air as a drive source. The supercharger 3 includes the compressor portion 13a and a turbine portion 13b.

The first compressor portion 13a of the first supercharger 13 is to pressurize and compress the intake air. The first compressor portion 13a is coupled to the first turbine portion 13b by a coupling shaft 13c. The first compressor portion 13a is configured such that rotation power from the first turbine portion 13b can be transmitted via the coupling shaft 13c. The first compressor portion 13a is connected to the low pressure side intercooler 15 via the air supply pipe 14.

The low pressure side intercooler 15 and the high pressure side intercooler 19 are to cool the intake air. By performing heat exchange between cooling water supplied by a cooling water pump (not shown) and the intake air, the low pressure side intercooler 15 and the high pressure side intercooler 19 cool the intake air. The low pressure side intercooler 15 is connected to the second compressor portion 17a via the air supply pipe 16. The high pressure side intercooler 19 is connected to the engine 11 via the air supply manifold 20.

The second supercharger 17 serving as a high pressure stage supercharger is to pressurize and compress the intake air with the exhaust pressure of the exhaust air as a drive source. The supercharger 3 includes the second compressor portion 17a and a second turbine portion 17b.

The second compressor portion 17a of the second supercharger 17 is to pressurize and compress the supplied air.

The second compressor portion 17a is coupled to the second turbine portion 17b by a coupling shaft 17c. The second compressor portion 17a is configured such that rotation power from the second turbine portion 17b can be transmitted via the coupling shaft 17c. The second compressor portion 17a is connected to the high pressure side intercooler 19 via the air supply pipe 18.

The air supply manifold 20 is to distribute the supplied air to the cylinders of the engine 11. The air supply manifold 20 is connected to the cylinders of the engine 11. The air supply manifold 20 is configured such that the supplied air cooled in the intercooler 5 can be supplied to the cylinders of the engine 1.

The exhaust device 21 includes exhaust manifolds 22, 23, an exhaust pipe 25, the first turbine portion 13b of the first supercharger 13, and the second turbine portion 17b of the second supercharger 17.

Regarding the exhaust manifolds 22, 23, the exhaust manifolds 22, 23 are respectively independently connected to two cylinder groups including cylinders of the same phase of the engine 11 (a group of first, fourth, and fifth cylinders, and a group of second, third, and sixth cylinders in the present embodiment). That is, the exhaust manifold 22 discharges the exhaust air from the first, fourth, and fifth cylinders together, and the exhaust manifold 23 discharges the exhaust air from the second, third, and sixth cylinders together.

A coupling pipe 24 (refer to the hatched part in FIG. 6) is detachably coupled to end parts (one side end parts) of the exhaust manifolds 22, 23. The second supercharger 17 is connected to the other side end parts of the exhaust manifolds 22, 23.

The coupling pipe 24 includes a bent pipe 24a, an on/off valve 24b, and an extension pipe 24c. The coupling pipe 24 is detachable from the exhaust manifolds 22, 23. With such a configuration, the coupling pipe 24 is formed so as to couple the independent exhaust manifolds 22, 23 to each other.

The first turbine portion 13b of the first supercharger 13 is to generate the rotation power by the pressure of the exhaust air. The first turbine portion 13b is coupled to the compressor portion 13a by the coupling shaft 13c, and is configured such that the rotation power can be transmitted to the compressor portion 13a. The first turbine portion 13b is configured so as to be rotated by the exhaust air supplied from the second turbine portion 17b of the second supercharger 17 via the exhaust pipe 25. The first turbine portion 13b is discharged to the outside via a purifying device (not shown) or the like.

The second turbine portion 17b of the second supercharger 17 is to generate the rotation power by the pressure of the exhaust air. The second turbine portion 17b is coupled to the second compressor portion 17a by the coupling shaft 17c, and is configured such that the rotation power can be transmitted to the second compressor portion 17a. The exhaust manifolds 22, 23 are connected to the second turbine portion 17b. The second turbine portion 17b is connected to the first turbine portion 13b of the first supercharger 13 via the exhaust pipe 25.

As described above, in the intake device 12, the first compressor portion 13a, the air supply pipe 14, the low pressure side intercooler 15, the air supply pipe 16, the second compressor portion 17a, the air supply pipe 18, the high pressure side intercooler 19, and the air supply manifold 20 are connected in order from the upstream side (outside). In the exhaust device 21, the exhaust manifolds 22, 23, the second turbine portion 17b, the exhaust pipe 25, and the first turbine portion 13b are connected in order from the upstream side (engine 11).

Next, a flow of the intake air in the intake device 12 and a flow of the exhaust air in the exhaust device 21 will be described with reference to FIG. 8.

Figure 8:
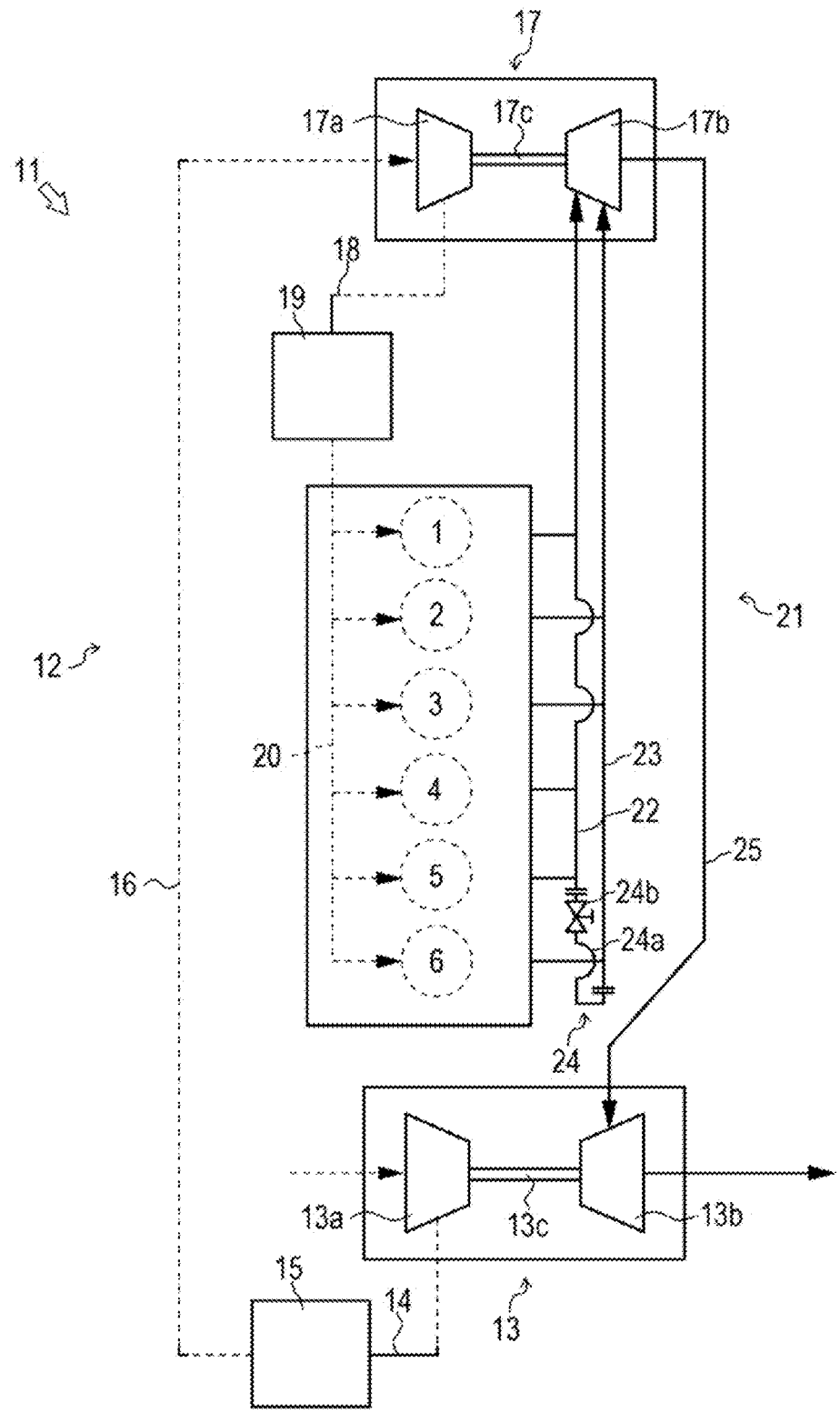
FIG. 8 is a schematic view showing a configuration of an engine and a supercharger according to a second embodiment of the present invention.

As shown in FIG. 8, in the intake device 12, the outside air (intake air) is taken in, pressurized, and compressed by the first compressor portion 13a of the first supercharger 13. At this time, by pressurization and compression of the intake air, compression heat is generated and a temperature is increased. The intake air pressurized and compressed in the first compressor portion 13a is discharged from the first supercharger 13.

The intake air discharged from the first supercharger 13 is supplied to the low pressure side intercooler 15 via the air supply pipe 14. The intake air supplied to the low pressure side intercooler 15 is cooled and then supplied to the second compressor portion 17a of the second supercharger 17 via the air supply pipe 16.

The intake air supplied to the second compressor portion 17a of the second supercharger 17 is pressurized and compressed by the second compressor portion 17a. At this time, by pressurization and compression of the intake air, the compression heat is generated and the temperature is increased. The intake air pressurized and compressed in the second compressor portion 17a is discharged from the second supercharger 17.

The intake air discharged from the second supercharger 17 is supplied to the high pressure side intercooler 19 via the air supply pipe 18. The intake air supplied to the high pressure side intercooler 19 is cooled and then supplied to the engine 11 via the air supply manifold 20.

In the exhaust device 21, the exhaust air from the engine 11 is supplied to the second turbine portion 17b of the second supercharger 17 via the exhaust manifold 22 and the exhaust manifold 23. The second turbine portion 17b is rotated by the exhaust air. The rotation power of the second turbine portion 17b is transmitted to the second compressor portion 17a via the coupling shaft 17c. The exhaust air supplied to the second turbine portion 17b is discharged from the second supercharger 17.

The exhaust air discharged from the second supercharger 17 is supplied to the first turbine portion 13b of the first supercharger 13 via the exhaust pipe 25. The first turbine portion 13b is rotated by the exhaust air. The rotation power of the first turbine portion 13b is transmitted to the first compressor portion 13a via the coupling shaft 13c. The exhaust air supplied to the first turbine portion 13b is discharged to the outside via the exhaust pipe 25, the purifying device (not shown), or the like.

Next, arrangement of the air supply pipe 16, the air supply manifold 20, the exhaust pipe 25, the exhaust manifolds 22, 23, the first supercharger 13, the second supercharger 17, the low pressure side intercooler 15, and the high pressure side intercooler 19 of the engine 11 according to the second embodiment of the present invention will be described.

Figure 9:
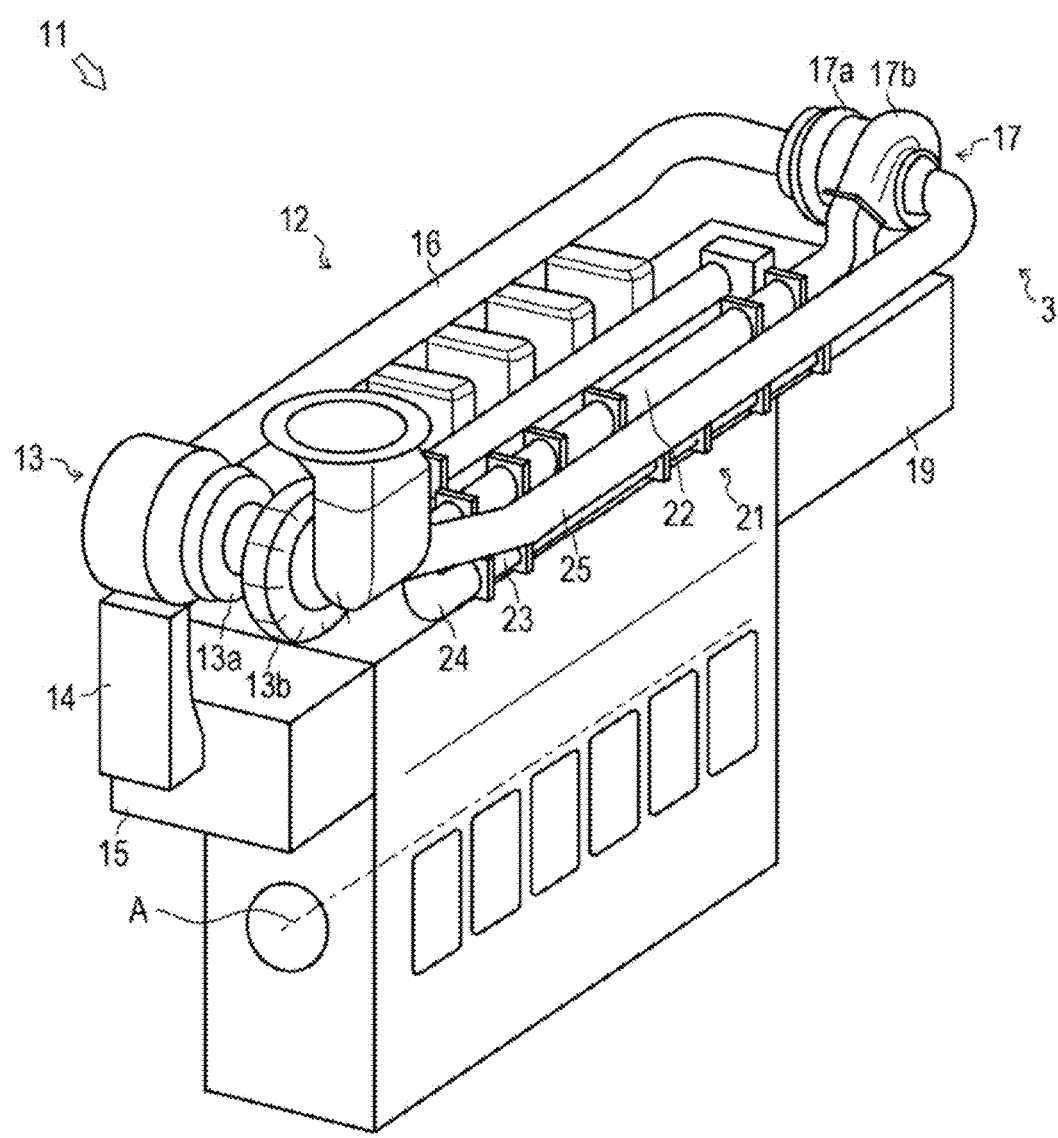
FIG. 9 is a perspective view showing the engine according to the second embodiment of the present invention.
Figure 10:
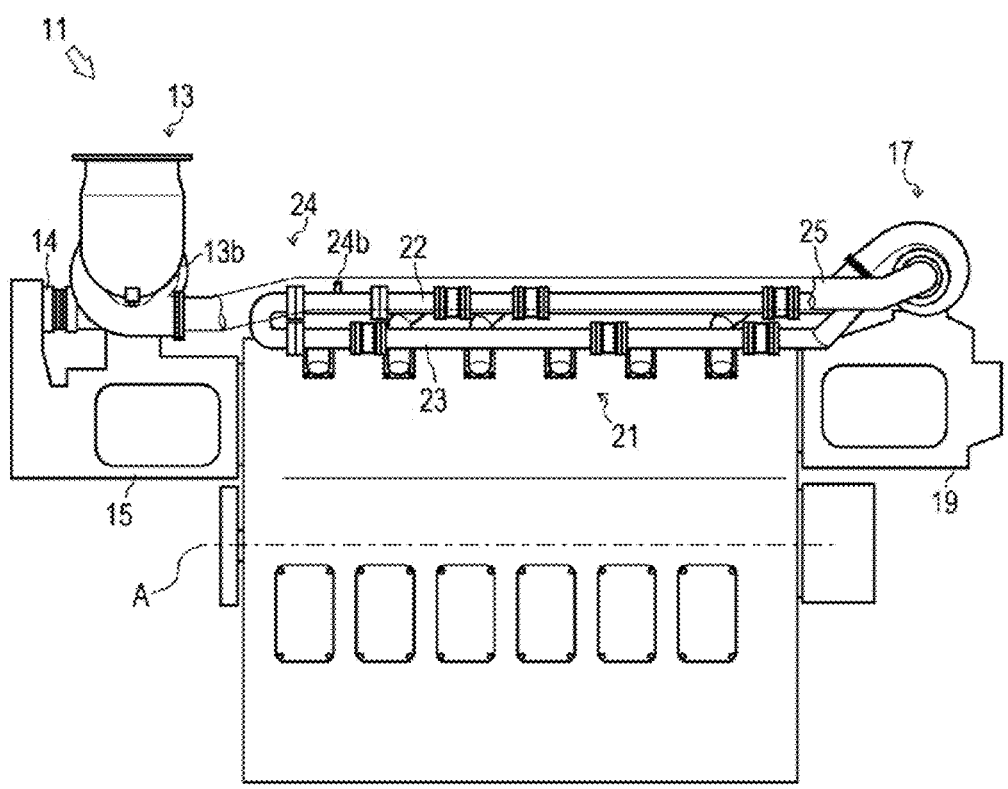
FIG. 10 is a side view showing the engine according to the second embodiment of the present invention.
Figure 11:
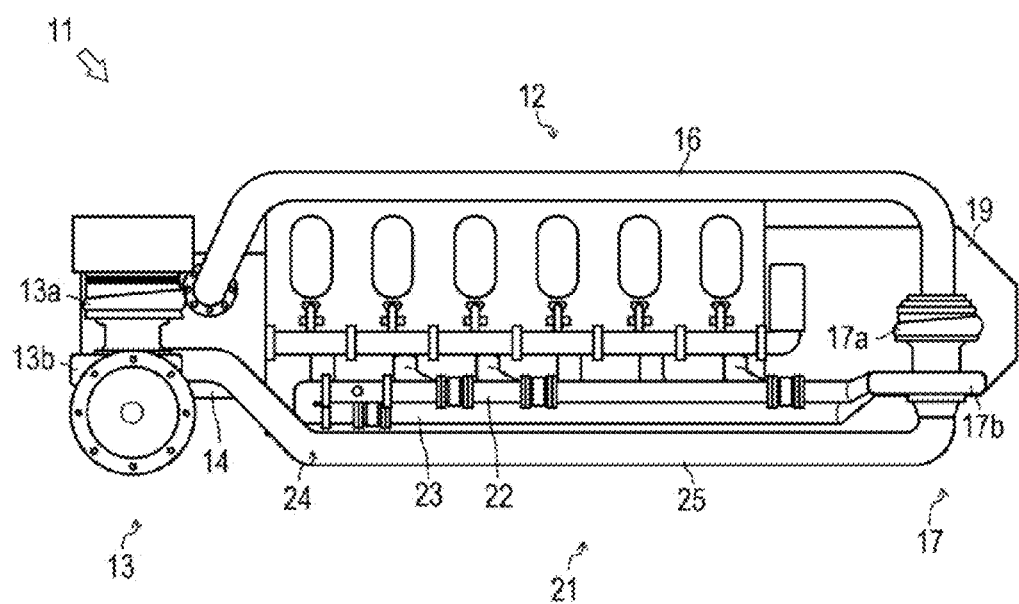
FIG. 11 is a plan view showing the engine according to the second embodiment of the present invention.

As shown in FIGS. 9 to 11, the low pressure side intercooler 15 is fixed to one side end part of the engine 11 in the axial direction of an output axis A. The first supercharger 13 is fixed to an upper part of the low pressure side intercooler 15. The high pressure side intercooler 19 is fixed to the other side end part of the engine 11 in the axial direction of the output axis A. The second supercharger 17 is fixed to an upper part of the high pressure side intercooler 19. That is, in the engine 11, the first supercharger 13 and the low pressure side intercooler 15 are disposed in the one side end part in the axial direction of the output axis A, and the second supercharger 17 and the high pressure side intercooler 19 are disposed in the other side end part in the axial direction of the output axis A.

The air supply pipe 16 connecting the low pressure side intercooler 15 and the second supercharger 17 is disposed on one side of the direction orthogonal to the output axis A of the engine 11 on a horizontal plane. The exhaust pipe 25 connecting the second supercharger 17 and the first supercharger 13 is disposed on the other side of the direction orthogonal to the output axis A of the engine 11 on the horizontal plane. Specifically, the air supply pipe 16 is disposed on the opposite side to the exhaust manifolds 22, 23 of the engine 11. The exhaust pipe 25 is disposed on the side of the exhaust manifolds 22, 23 of the engine 11. That is, in the engine 11, the air supply pipe 16 and the exhaust pipe 25 are disposed so as to face each other across the engine 11.

The air supply manifold 20 is disposed in an engine block of the engine 11 on the other side of the direction orthogonal to the output axis A on the horizontal plane. Similarly, the exhaust manifolds 22, 23 are disposed on the other side of the direction orthogonal to the output axis A of the engine 11 on the horizontal plane. Specifically, the exhaust manifolds 22, 23 are disposed between the engine 11 and the exhaust pipe 25. The exhaust manifold 23 is disposed in line with the exhaust manifold 22 on the lower side of the exhaust manifold 22.

Hereinafter, the exhaust manifolds 22, 23 and the coupling pipe 24 of the engine 11 according to the second embodiment of the present invention will be specifically described with reference to FIGS. 6 and 7. FIGS. 6 and 7 represent one side parts of the exhaust manifolds 22, 23 of the engine 11.

As shown in FIGS. 6 and 7, the coupling pipe 24 (hatched part) is detachably coupled to the end parts (one side end parts) of the exhaust manifolds 22, 23, the end parts on the side of the first supercharger 13. The second supercharger 17 is connected to the other side end parts of the exhaust manifolds 22, 23 (refer to FIGS. 8 to 11).

The coupling pipe 24 is to couple the exhaust manifold 22 and the exhaust manifold 23. The coupling pipe 24 includes the bent pipe 24a, the on/off valve 24b, and the extension pipe 24c. The coupling pipe 24 is detachable from the one side end parts of the exhaust manifolds 22, 23. The coupling pipe 24 is formed so as to switch whether or not the exhaust manifold 22 and the exhaust manifold 23 communicate with each other by a state of the on/off valve 24b.

As shown in FIG. 6, regarding the exhaust manifold 22 and the exhaust manifold 23, one side end part of the bent pipe 24a is coupled to the one side end part of the exhaust manifold 23, and the one side end part of the exhaust manifold 22 is coupled to the other side end part of the bent pipe 24a via the on/off valve 24b. As shown in FIG. 6, the coupling pipe 24 is configured such that the extension pipe 24c can be connected instead of the on/off valve 24b. Accordingly, the coupling pipe 24 is formed so as to couple the exhaust manifold 22 and the exhaust manifold 23 without the on/off valve 24b.

In the exhaust device 21, in a case where the on/off valve 24b of the coupling pipe 24 is brought into a closed state, the exhaust manifold 22 and the exhaust manifold 23 are independently connected to the second turbine portion 17b of the second supercharger 17. That is, in the exhaust device 21, the exhaust manifolds corresponding to the dynamic pressure supercharging method are formed. In the exhaust device 21, in a case where the on/off valve 24b is brought into an opened state, the exhaust manifold 22 and the exhaust manifold 23 are connected to the second turbine portion 17b of the second supercharger 17 in a state where the exhaust manifolds communicate with each other. That is, in the exhaust device 21, the exhaust manifolds 22, 23 corresponding to the static pressure supercharging method are formed.

As shown in FIG. 6, in a case where the exhaust air is supplied to the first supercharger 13 and the second supercharger 17 only by dynamic pressure supercharging, the coupling pipe 24 is removed from the exhaust manifolds 22, 23 in the exhaust device 21. At this time, the one side end parts of the exhaust manifolds 22, 23 are sealed by lids 8a, 9a, respectively. Accordingly, in the exhaust device 21, the exhaust manifold 22 and the exhaust manifold 23 are connected to the second supercharger 17 in a state where the exhaust manifolds are independent from each other. That is, in the exhaust device 21, the exhaust manifolds 22, 23 corresponding only to the dynamic pressure supercharging method are formed.

As shown in FIG. 7, in a case where the exhaust air is supplied to the first supercharger 13 and the second supercharger 17 only by static pressure supercharging, the on/off valve 24b is removed from the coupling pipe 24 and instead, the extension pipe 24c is attached in the exhaust device 21. Accordingly, in the exhaust device 21, the exhaust manifold 22 and the exhaust manifold 23 are connected to the second supercharger 17 in a state where the exhaust manifolds communicate with each other. That is, in the exhaust device 21, the exhaust manifolds 22, 23 corresponding only to the static pressure supercharging method are formed.

As described above, in the engine 11 according to the second embodiment of the present invention, the one side end part of the exhaust manifold 22 and the one side end part of the exhaust manifold 23 are coupled by the coupling pipe 24. In the engine 11, the coupling pipe 24 including the on/off valve 24b or only the on/off valve 24b is easily attached to and detached from the exhaust manifolds 22, 23. Accordingly, without replacing the exhaust manifolds 22, 23, the exhaust manifolds 22, 23 capable of switching the dynamic pressure supercharging method and the static pressure supercharging method can be easily changed to the exhaust manifolds 22, 23 only of the dynamic pressure supercharging method or only of the static pressure supercharging method.

Figure 12:
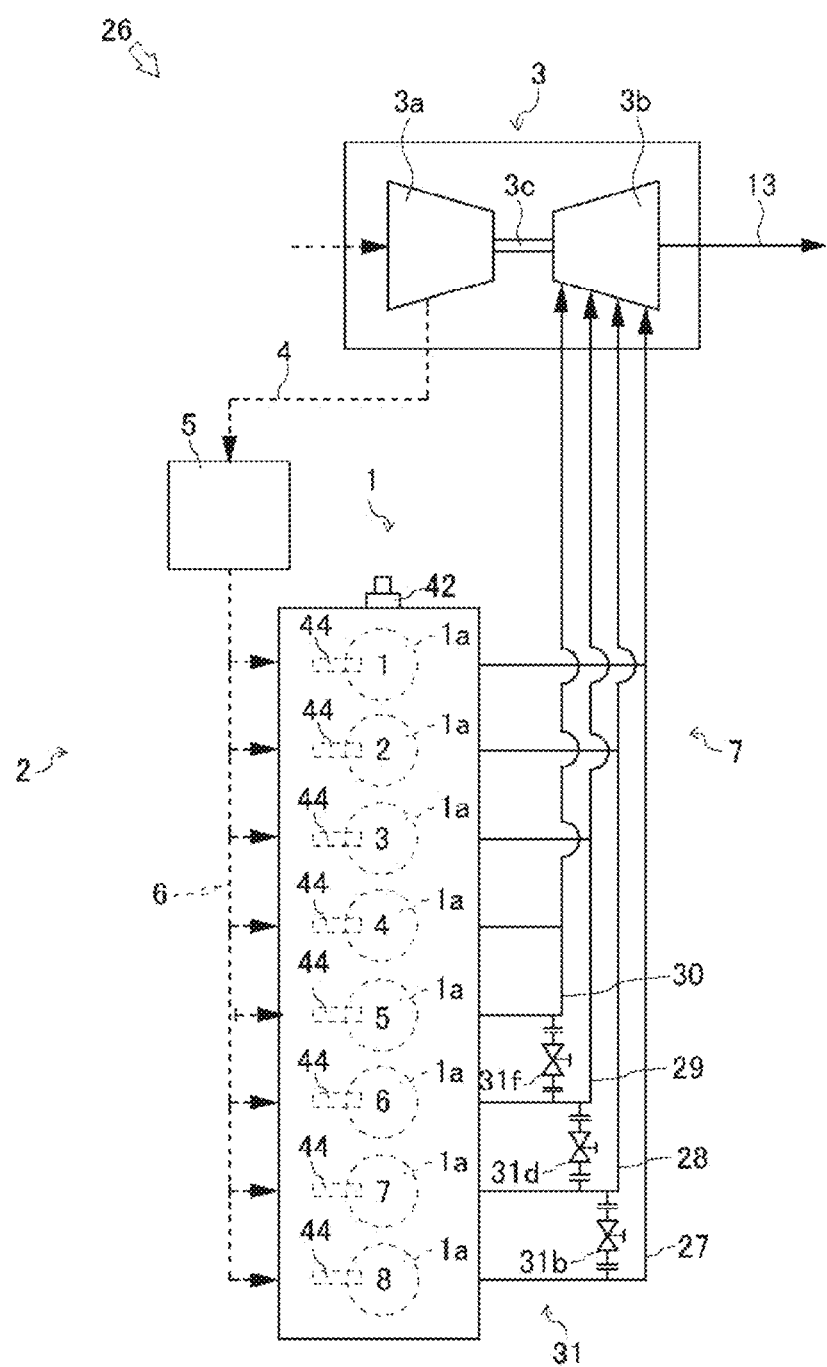
FIG. 12 is a schematic view showing a configuration of an engine and a supercharger according to a third embodiment of the present invention.

Next, a coupling mode of exhaust manifolds of an engine 26 including a supercharger 3 according to a third embodiment of the present invention will be specifically described with reference to FIGS. 12 and 13. In the following embodiment, regarding the same points as the embodiments described above, specific description thereof will be omitted and different parts will be mainly described. FIG. 12 represents one side parts of exhaust manifolds 27, 28, 29, 30 of the engine 26.

As shown in FIG. 12, the engine 26 is a diesel engine, and in the present embodiment, an in-line eight-cylinder engine which has eight cylinders. As shown in FIG. 12, the exhaust manifolds 27, 28, 29, 30 are respectively independently connected to four cylinder groups including cylinders of the same phase of the engine 26 (a group of first and eighth cylinders, a group of second and seventh cylinders, a group of third and sixth cylinders, and a group of fourth and fifth cylinders in the present embodiment). That is, the exhaust manifold 27 discharges the exhaust air from the first and eighth cylinders together, the exhaust manifold 28 discharges the exhaust air from the second and seventh cylinders together, the exhaust manifold 29 discharges the exhaust air from the third and sixth cylinders together, and the exhaust manifold 30 discharges the exhaust air from the fourth and fifth cylinders together.

Figure 13:
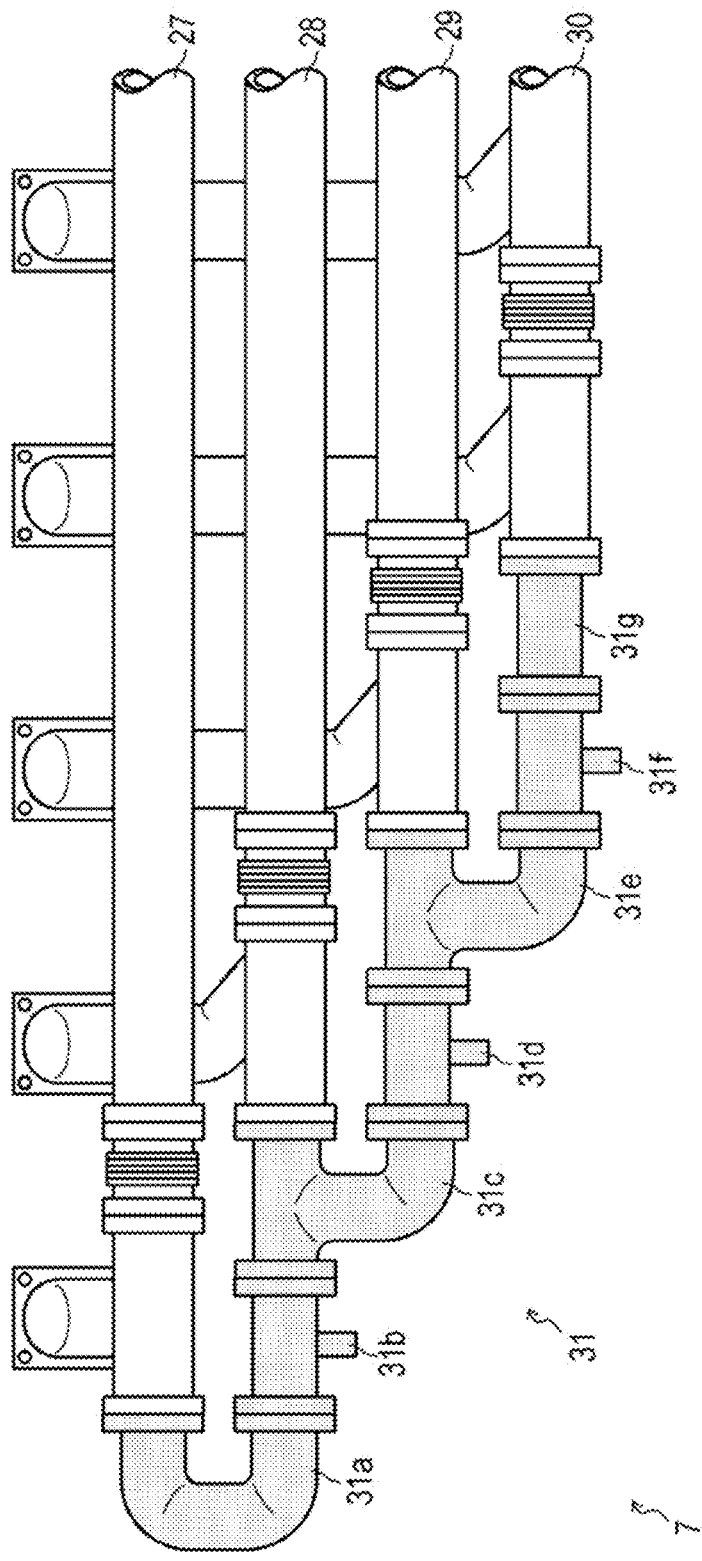
FIG. 13 is a schematic view showing a configuration of coupling of exhaust manifolds of the engine according to the third embodiment of the present invention.

As shown in FIG. 13, a coupling pipe 31 (hatched part) is detachably coupled to end parts (one side end parts) of the exhaust manifolds 27, 28, 29, 30, the end parts on the opposite side to the supercharger 3.

The coupling pipe 31 includes a bent pipe 31a, a first on/off valve 31b, a first branch pipe 31c, a second on/off valve 31d, a second branch pipe 31e, a third on/off valve 31f, and an extension pipe 31g. The bent pipe 31a, the first on/off valve 31b, the first branch pipe 31c, the second on/off valve 31d, the second branch pipe 31e, the third on/off valve 31f, and the extension pipe 31g are formed in the exhaust manifolds 27, 28, 29, 30 attachably to and detachably from each other. With such a configuration, the coupling pipe 31 is formed so as to couple the three or more independent exhaust manifolds to each other.

Regarding the adjacent exhaust manifolds 27 and 28, one side end part of the bent pipe 31a is coupled to one side end part of the exhaust manifold 27, and the exhaust manifold 28 is coupled to the other side end part of the bent pipe 31a via the first on/off valve 31b and the first branch pipe 31c. Regarding the adjacent exhaust manifolds 28 and 29, the exhaust manifold 29 is coupled to the first branch pipe 31c coupled to the exhaust manifold 28 via the second on/off valve 31d and the second branch pipe 31e. Regarding the adjacent exhaust manifolds 29 and 30, the exhaust manifold 30 is coupled to the second branch pipe 31e coupled to the exhaust manifold 29 via the third on/off valve 31f and the extension pipe 31g. That is, the exhaust manifolds 27, 28, 29, 30 are coupled to each other by the coupling pipe 31.

As described above, in the engine 26 according to the other embodiment of the present invention, the one side end parts of the exhaust manifolds 27, 28, 29, 30 are coupled to each other by the coupling pipe 31. That is, the coupling pipe 31 is disposed and concentrated on the one side end parts of the exhaust manifolds 27, 28, 29, 30. Accordingly, in the engine 26, even in a case where the three or more exhaust manifolds 27, 28, 29, 30 are coupled, the exhaust manifolds 27, 28, 29, 30 capable of switching the dynamic pressure supercharging method and the static pressure supercharging method can be formed with a configuration in which attachment and detachment of the coupling pipe 31 and maintenance of the first on/off valve 31b, the second on/off valve 31d, and the third on/off valve 31f are easily performed.

Hereinafter, an engine 1 including a supercharger 3 according to one of other embodiments of the present invention will be described with reference to FIGS. 12 to 14.

As shown in FIG. 12, the engine 1 is a diesel engine, and in the present embodiment, an in-line eight-cylinder engine which has eight cylinders. In the present embodiment, the engine is an in-line eight-cylinder engine including the single stage supercharger 3. However, the present invention is not limited to this but the engine may be a multicylinder engine of eight or more cylinders including a plurality of superchargers 3 (for example, two-stage supercharger).

In the engine 1, an output shaft is driven and rotated by mixing and combusting the outside air and fuel supplied from fuel injection valves 44 inside cylinders 1a. The engine 1 includes an intake device 2 that takes the outside air in, and an exhaust device 7 that discharges the exhaust air to the outside. The engine 1 also includes a rotation speed detection sensor 42, an injection amount detection sensor 43 for the fuel injection valves 44, and an ECU 41 serving as a control device.

The exhaust device 7 includes exhaust manifolds 27, 28, 29, 30, and a turbine portion 3b of the supercharger 3.

Regarding the exhaust manifolds 27, 28, 29, 30, the exhaust manifolds 27, 28, 29, 30 are respectively independently connected to four cylinder groups including cylinders of the same phase of the engine 1 (a group of first and eighth cylinders, a group of second and seventh cylinders, a group of third and sixth cylinders, and a group of fourth and fifth cylinders in the present embodiment). That is, the exhaust manifold 27 discharges the exhaust air from the first and eighth cylinders together, the exhaust manifold 28 discharges the exhaust air from the second and seventh cylinders together, the exhaust manifold 29 discharges the exhaust air from the third and sixth cylinders together, and the exhaust manifold 30 discharges the exhaust air from the fourth and fifth cylinders together.

As shown in FIG. 13, a coupling pipe 31 (hatched part) is detachably coupled to end parts (one side end parts) of the exhaust manifolds 27, 28, 29, 30. The supercharger 3 is connected to the other side end parts of the exhaust manifolds 27, 28, 29, 30.

The coupling device 31 includes a bent pipe 31a, an on/off valve 31b, a branch pipe 31c, an on/off valve 31d, a branch pipe 31e, an on/off valve 31f, and an extension pipe 31g. The bent pipe 31a, the on/off valve 31b, the branch pipe 31c, the on/off valve 31d, the branch pipe 31e, the on/off valve 31f, and the extension pipe 31g are detachable from each other in addition to the exhaust manifolds 27, 28, 29, 30. With such a configuration, the coupling device 31 is formed so as to couple the three or more independent exhaust manifolds to each other.

Regarding the adjacent exhaust manifolds 27 and 28, one side end part of the bent pipe 31a is coupled to one side end part of the exhaust manifold 27, and the exhaust manifold 28 is coupled to the other side end part of the bent pipe 31a via the on/off valve 31b and the branch pipe 31c. Regarding the adjacent exhaust manifolds 28 and 29, the exhaust manifold 29 is coupled to the branch pipe 31c coupled to the exhaust manifold 28 via the on/off valve 31d and the branch pipe 31e. Regarding the adjacent exhaust manifolds 29 and 30, the exhaust manifold 30 is coupled to the branch pipe 31e coupled to the exhaust manifold 29 via the on/off valve and the extension pipe 31g. That is, the exhaust manifolds 27, 28, 29, 30 are coupled to each other by the coupling device 31.

With such a configuration, the one side end parts of the exhaust manifolds 27, 28, 29, 30 are coupled to each other by the coupling device 31. That is, the coupling device 31 is disposed and concentrated on the one side end parts of the exhaust manifolds 27, 28, 29, 30. With such a configuration, in the exhaust device 7, the exhaust manifolds 27, 28, 29, 30 capable of switching the dynamic pressure supercharging method and the static pressure supercharging method can be formed with a configuration in which attachment and detachment of the coupling device 31 and maintenance of the on/off valve 31b, the on/off valve 31d, and the on/off valve 31f are easily performed.

As shown in FIGS. 12 and 13, the turbine portion 3b of the supercharger 3 is to generate rotation power by pressure of the exhaust air. The turbine portion 3b is coupled to a compressor portion 3a by a coupling shaft 3c, and is configured such that the rotation power can be transmitted to the compressor portion 3a. The exhaust manifolds 27, 28, 29, 30 are connected to the turbine portion 3b. The turbine portion 3b communicates with the outside via an exhaust pipe 13.

As described above, in the intake device 2, the compressor portion 3a of the supercharger 3, an air supply pipe 4, an intercooler 5, and an air supply manifold 6 are connected in order from the upstream side (outside). In the exhaust device 7, the exhaust manifolds 27, 28, 29, 30, the turbine portion 3b of the supercharger 3, and the exhaust pipe 13 are connected in order from the upstream side (engine 1).

In the exhaust device 7, in a case where all the on/off valves 31b, 31d, 31f are brought into a closed state, the exhaust manifolds 27, 28, 29, 30 are respectively independently connected to the turbine portion 3b of the supercharger 3. Accordingly, in the exhaust device 7, the exhaust manifolds corresponding to the dynamic pressure supercharging method are formed.

In the exhaust device 7, in a case where the on/off valves 31b, 31f are brought into an opened state, the exhaust manifold 27 and the exhaust manifold 28 communicate with each other, and the exhaust manifold 29 and the exhaust manifold 30 communicate with each other. That is, the communicating exhaust manifolds 27, 28 and the communicating exhaust manifolds 29, 30 are independently connected to the turbine portion 3b of the supercharger 3. Accordingly, in the exhaust device 7, two sets of exhaust manifolds 27, 28 and exhaust manifolds 29, 30 corresponding to the static pressure supercharging method are formed.

In the exhaust device 7, in a case where the on/off valves 31b, 31d are brought into an opened state, the exhaust manifold 27, the exhaust manifold 28, and the exhaust manifold 29 communicate with each other. That is, the communicating exhaust manifolds 27, 28, 29 and the exhaust manifold 30 are independently connected to the turbine portion 3b of the supercharger 3. Accordingly, in the exhaust device 7, the exhaust manifolds 27, 28, 29 corresponding to the static pressure supercharging method and the exhaust manifold 30 corresponding to the dynamic pressure supercharging method are mixed and formed.

In the exhaust device 7, in a case where all the on/off valves are brought into an opened state, the exhaust manifolds 27, 28, 29, 30 are connected to the turbine portion 3b of the supercharger 3 in a state where the exhaust manifolds communicate with each other. That is, in the exhaust device 7, the exhaust manifolds 27, 28, 29, 30 corresponding to the static pressure supercharging method are formed.

Next, a control configuration of the engine 1 according to one embodiment of the present invention will be described with reference to FIG. 14.

Figure 14:
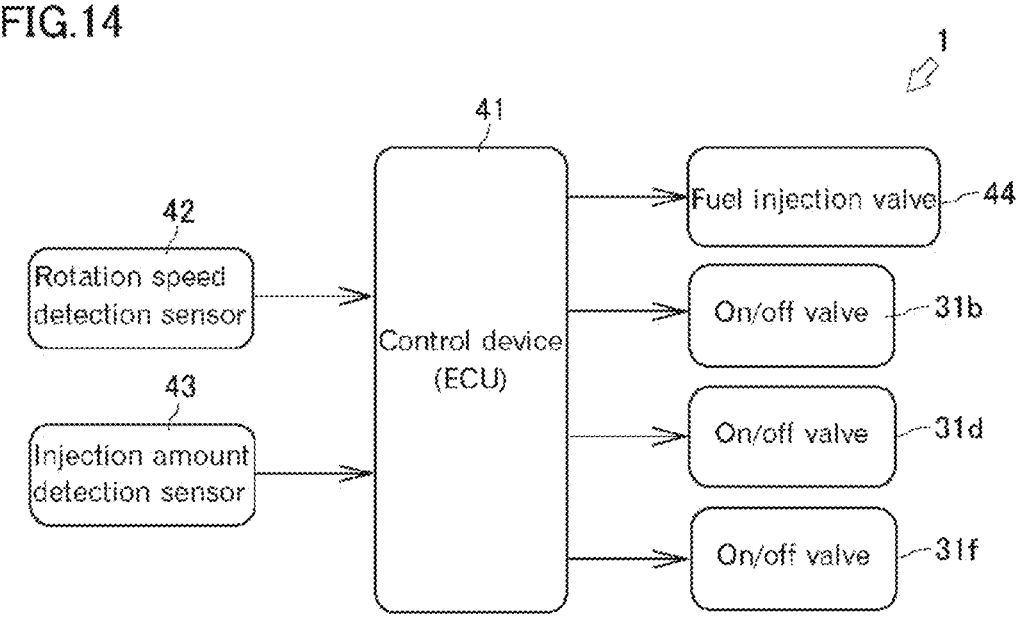
FIG. 14 is a schematic view showing a control configuration of the engine according to one embodiment of the present invention.

As shown in FIG. 14, the rotation speed detection sensor 42 is to detect the rotation speed N serving as the engine rotation speed of the engine 1. The rotation speed detection sensor 42 is configured by a sensor and a pulsar, and provided in the output shaft of the engine 1. Although the rotation speed detection sensor 42 is configured by the sensor and the pulsar in the present embodiment, the rotation speed detection sensor may be anything capable of detecting the rotation speed N.

The injection amount detection sensor 43 is to detect an injection amount F of the fuel injected from the fuel injection valves 44. The injection amount detection sensor 43 is provided in an intermediate part of a fuel supply pipe (not shown). The injection amount detection sensor 43 is configured by a flow rate sensor. Although the injection amount detection sensor 43 is configured by the flow rate sensor in the present embodiment, the present invention is not limited to this and the injection amount detection sensor may be anything capable of detecting the injection amount F of the fuel.

The ECU 41 is to control the engine 1. Specifically, the ECU controls a main body of the engine 1 and the on/off valves 31b, 31d, 31f. Various programs and data for controlling the engine 1 are stored in the ECU 41. The ECU 41 may have a configuration in which a CPU, a ROM, a RAM, a HDD, and the like are connected by a bus, or a configuration in which the ECU includes a single-chip LSI or the like.

The ECU 41 is connected to the rotation speed detection sensor 42, and is capable of acquiring the rotation speed N detected by the rotation speed detection sensor 42.

The ECU 41 is connected to the fuel injection valves 44, and is capable of controlling the fuel injection valves 44.

The ECU 41 is connected to the injection amount detection sensor 43, and is capable of acquiring the injection amount F detected by the injection amount detection sensor 43.

The ECU 41 is connected to the on/off valves 31*b*, 31*d*, 31*f* of the exhaust manifolds 27, 28, 29, 30, and is capable of controlling an opened/closed state of the on/off valves 31*b*, 31*d*, 31*f*.

An output torque map M1 for calculating output torque T of the engine 1 based on the acquired rotation speed N and the acquired injection amount F is stored in the ECU 41. Further, a load factor calculation map M2 for calculating a load factor L(n) of the engine 1 based on the acquired rotation speed N and the calculated output torque T is stored in the ECU 41. The load factor L(n) indicates an n-thly calculated load factor L. An on/off valve map M3 for determining an opened/closed state of the on/off valves 31*b*, 31*d*, 31*f* to minimize fuel consumption FC of the engine 1 based on the acquired rotation speed N and the calculated load factor L(n) is stored in the ECU 41.

The on/off valve map M3 stored in the ECU 41 will be described with reference to FIGS. 15 and 16. The on/off valve map M3 shows a first reference value La and a second reference value Lb serving as load factors used as a reference for determining an opened/closed state of the on/off valves 31*b*, 31*d*, 31*f* based on the acquired rotation speed N and the calculated load factor L(n) of the engine 1.

Figure 15:
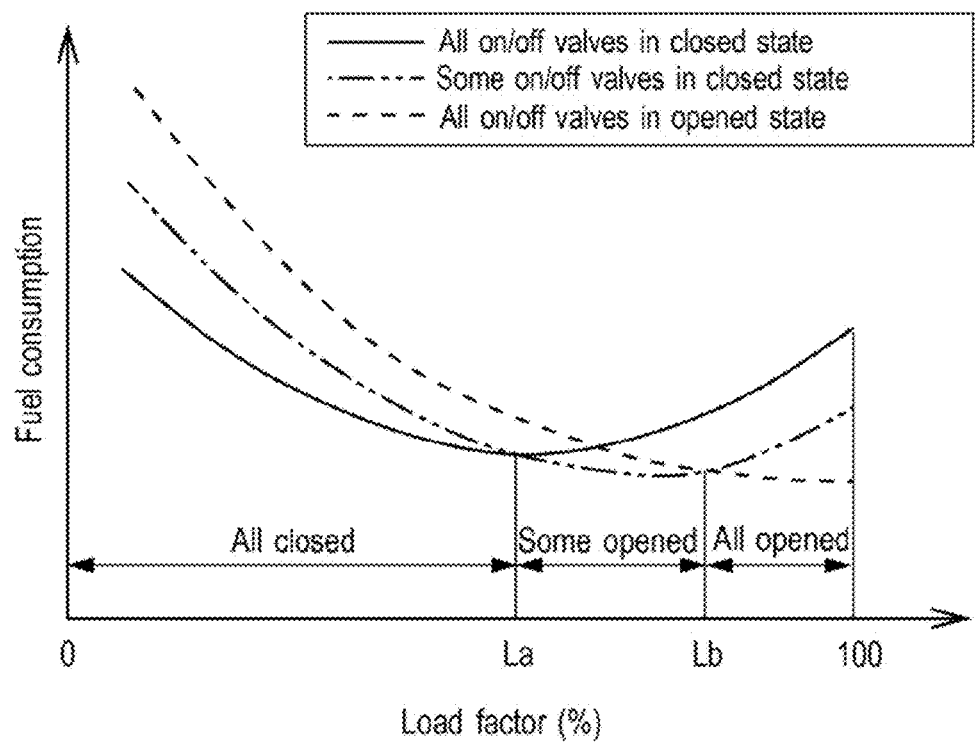
FIG. 15 is a graph representing a relationship between a state of on/off valves for each load factor with a certain rotation speed of the engine according to one embodiment of the present invention and fuel consumption.

As shown in FIG. 15, the first reference value La is a load factor in the boundary between a range of the load factor L(n) in which the fuel consumption FC of the engine 1 is minimum when all the on/off valves among the on/off valves 31*b*, 31*d*, 31*f* are in a closed state with an arbitrary rotation speed N of the engine 1, and a range of the load factor L(n) in which the fuel consumption FC is minimum when some of the on/off valves (for example, the on/off valves 31*b*, 31*f*) are in an opened state. The second reference value Lb is a load factor in the boundary between a range of the load factor L(n) in which the fuel consumption FC of the engine 1 is minimum when some of the on/off valves among the on/off valves 31*b*, 31*d*, 31*f* are in an opened state with an arbitrary rotation speed N of the engine 1, and a range of the load factor L(n) in which the fuel consumption FC is minimum when all the on/off valves are in an opened state. That is, in the engine 1, for each arbitrary rotation speed N, a state of the on/off valves for minimizing the fuel consumption FC is determined from a relationship between the load factor L(n) and the first reference value La and a relationship between the load factor L(n) and the second reference value Lb.

Figure 16:
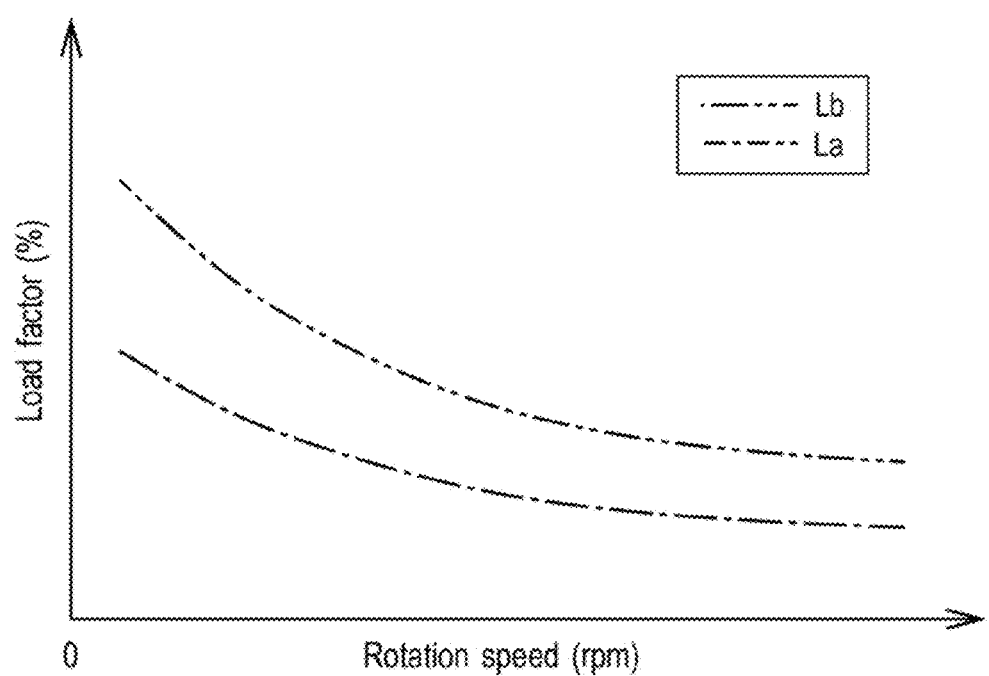
FIG. 16 is a graph (map) representing a relationship between a state of the on/off valves to minimize the fuel consumption for each rotation speed of the engine according to one embodiment of the present invention and a load factor.

As shown in FIG. 16, the on/off valve map M3 is configured by the first reference value La and the second reference value Lb for each number of the rotation speed N of the engine 1. That is, the on/off valve map M3 shows a relationship between a range of the load factor L(n) in which the fuel consumption FC of the engine 1 is minimum for each rotation speed N and a state of the on/off valves 31*b*, 31*d*, 31*f*.

Next, a control mode of the on/off valves 31*b*, 31*d*, 31*f* of the engine 1 according to the present invention will be described.

The ECU 41 calculates the load factor L(n) of the engine 1 from the output torque map M1 and the load factor calculation map M2 based on the acquired rotation speed N and the acquired injection amount F. In a case where an increase/decrease amount of the load factor L(n) per unit time is less than a predetermined value Lc, the ECU 41 judges that an operation state of the engine 1 is fixed. That is, the ECU 41 judges that the vessel 100 is operated in a fixed running mode in which the fuel consumption is focused on. The ECU 41 determines an opened/closed state of the on/off valves 31*b*, 31*d*, 31*f* of the engine 1 from the on/off valve map M3 based on the acquired rotation speed N and the calculated load factor L(n).

In a case where the increase/decrease amount of the load factor L(n) per unit time is the predetermined value Lc or more, the ECU 41 judges that the operation state of the engine 1 is changing. That is, the ECU 41 judges that the vessel 100 is operated in a transient mode in which a response of acceleration/deceleration is focused on. The ECU 41 brings all the on/off valves 31*b*, 31*d*, 31*f* into a closed state irrespective of the acquired rotation speed N and the calculated load factor L(n).

Next, the control mode of the on/off valves 31*b*, 31*d*, 31*f* of the engine 1 will be specifically described with reference to FIGS. 16 to 18.

Figure 17:
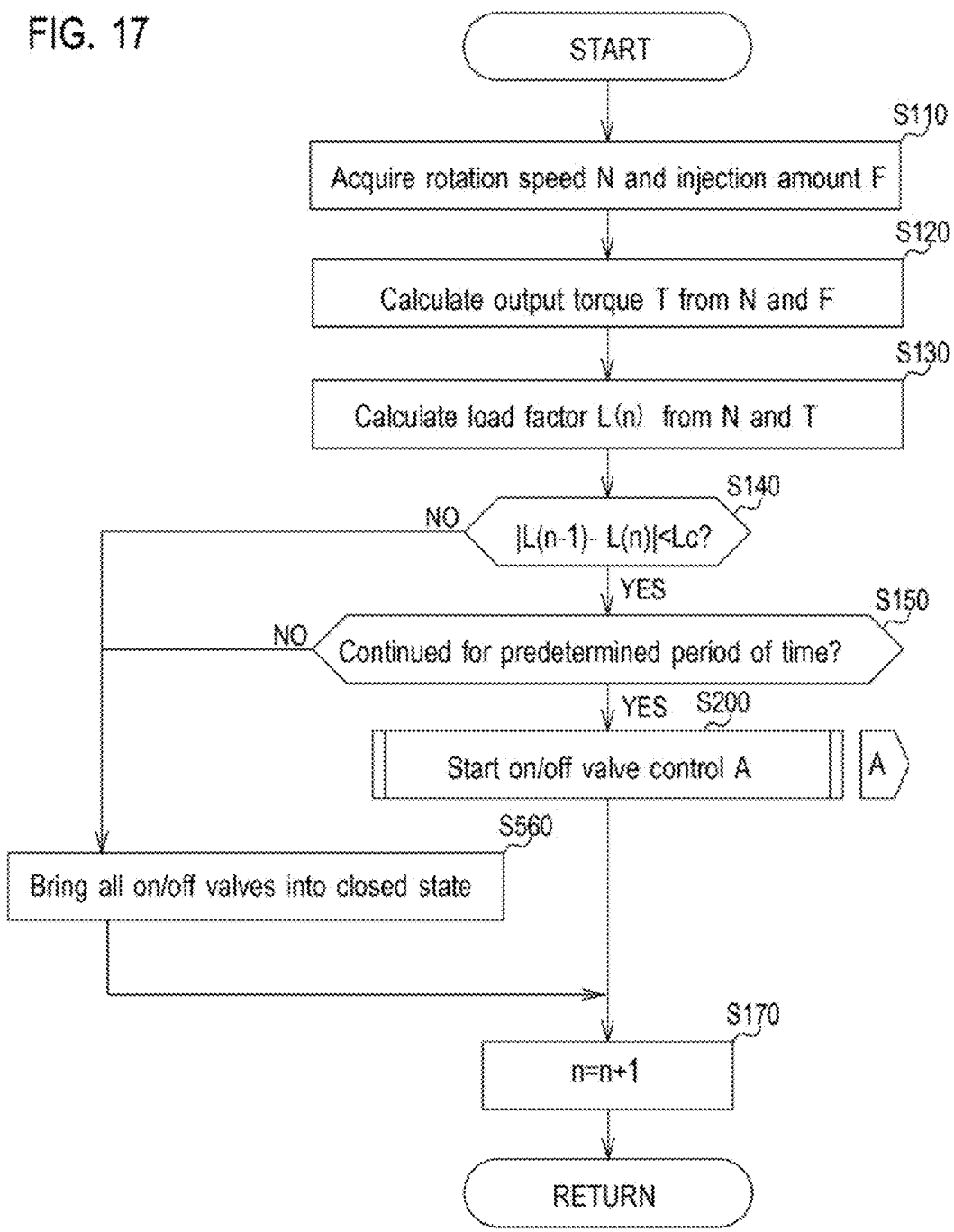
FIG. 17 is a flowchart representing a control mode of on/off valves of the engine according to another embodiment of the present invention.
Figure 18:
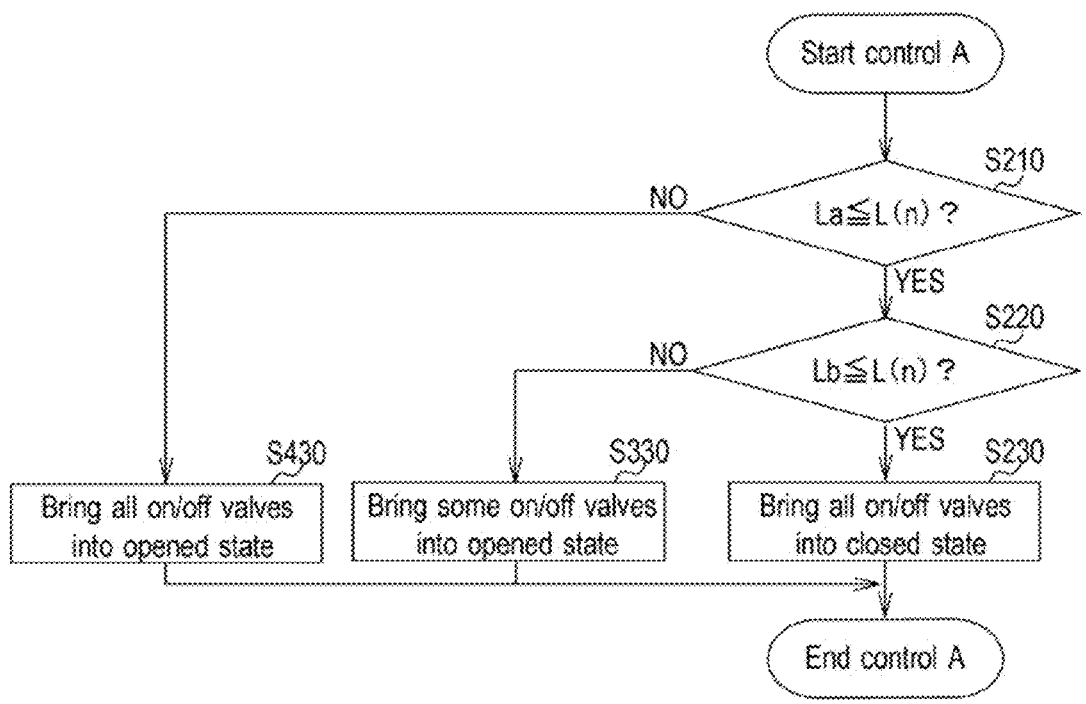
FIG. 18 is a flowchart representing on/off valve control in the control mode of the on/off valves of the engine according to another embodiment of the present invention.

As shown in FIGS. 16 to 18, in Step S110, the ECU 41 acquires the rotation speed N detected by the rotation speed detection sensor 42 and the injection amount F detected by the injection amount detection sensor 43, and shifts the flow to Step S120.

In Step S120, the ECU 41 calculates the output torque T of the engine 1 from the output torque map M1 based on the acquired rotation speed N and the acquired injection amount F, and shifts the flow to Step S130.

In Step S130, the ECU 41 calculates the load factor L(n) of the engine 1 from the load factor calculation map M2 based on the acquired rotation speed N and the calculated output torque T, and shifts the flow to Step S140.

In Step S140, the ECU 41 judges whether or not an absolute value of a difference between the calculated L(n) and L(n−1) is less than the predetermined value Lc.

In a case where the ECU judges that the absolute value of the difference between the calculated L(n) and L(n−1) is less than the predetermined value Lc as a result, the ECU 41 shifts the flow to Step S150.

On the other hand, in a case where the ECU judges that the absolute value of the difference between the calculated L(n) and L(n−1) is not less than the predetermined value Lc, that is, in a case where the ECU judges that the absolute value of the difference between the calculated L(n) and L(n−1) is the predetermined value Lc or more, the ECU 41 shifts the flow to Step S560.

In Step S150, the ECU 41 judges whether or not a state where the absolute value of the difference between the calculated L(n) and L(n−1) is less than the predetermined value Lc is continued for a predetermined period of time T or longer.

In a case where the ECU judges that the state where the absolute value of the difference between the calculated L(n) and L(n−1) is less than the predetermined value Lc is continued for the predetermined period of time T or longer as a result, the ECU 41 shifts the flow to Step S200.

On the other hand, in a case where the ECU judges that the state where the absolute value of the difference between the calculated L(n) and L(n−1) is less than the predetermined value Lc is not continued for the predetermined period of time T or longer, the ECU 41 shifts the flow to Step S560.

In Step S200, the ECU 41 starts on/off valve control A, and shifts the flow to Step 210 (refer to FIG. 18).

In Step S170, the ECU 41 makes n=n+1, and shifts the flow to Step S110.

As shown in FIG. 18, in Step S210, the ECU 41 judges whether or not the calculated L(n) is the first reference value La or more.

In a case where the ECU 41 judges that the calculated L(n) is the first reference value La or more as a result, the ECU 41 shifts the flow to Step S220.

On the other hand, in a case where the ECU 41 judges that the calculated L(n) is not the first reference value La or more, that is, in a case where the ECU 41 judges that the calculated L(n) is less than the first reference value La, the ECU 41 shifts the flow to Step S430.

In Step S220, the ECU 41 judges whether or not the calculated L(n) is the second reference value Lb or more.

In a case where the ECU 41 judges that the calculated L(n) is the second reference value Lb or more as a result, the ECU 41 shifts the flow to Step S230.

On the other hand, in a case where the ECU 41 judges that the calculated L(n) is not the second reference value Lb or more, that is, in a case where the ECU 41 judges that the calculated L(n) is the first reference value La or more and less than the second reference value Lb, the ECU 41 shifts the flow to Step S330.

In Step S230, the ECU 41 brings all the on/off valves 31*b*, 31*d*, 31*f* of the exhaust manifolds into an opened state, finishes the on/off valve control A, and shifts the flow to Step S110 (refer to FIG. 17).

In Step S330, the ECU 41 brings the on/off valves 31*b*, 31*f* or the on/off valves 31*b*, 31*d* of the exhaust manifolds into an opened state, finishes the on/off valve control A, and shifts the flow to Step S110 (refer to FIG. 17).

In Step S430, the ECU 41 brings all the on/off valves 31*b*, 31*d*, 31*f* of the exhaust manifolds into a closed state, finishes the on/off valve control A, and shifts the flow to Step S110 (refer to FIG. 17).

As shown in FIG. 17, in Step S560, the ECU 41 brings all the on/off valves 31*b*, 31*d*, 31*f* of the exhaust manifolds into a closed state, and shifts the flow to Step S170.

As described above, in the engine 1 according to the present invention, by switching an opened/closed state of the on/off valves 31*b*, 31*d*, 31*f* of the exhaust manifolds 27, 28, 29, 30 based on the rotation speed N and the load factor L(n), a pressure state of the exhaust air supplied to the supercharger 3 is changed. Accordingly, responsiveness of the supercharger 3 at the time of low-speed rotation of the supercharger 3 and the fuel consumption of the engine 1 at the time of high-speed rotation of the supercharger 3 can be improved. When a load state of the engine 1 is changed, by switching all the on/off valves 31*b*, 31*d*, 31*f* into a closed state, the responsiveness of the supercharger 3 is improved. Accordingly, generation of black smoke at the time of a transient response can be suppressed and the fuel consumption can also be improved.

INDUSTRIAL APPLICABILITY

The present invention can be utilized for a technology of an engine with a supercharger.

DESCRIPTION OF REFERENCE SIGNS

1: Engine
3: Supercharger
8: Exhaust manifold
9: Exhaust manifold
10: Coupling pipe
10*b*: On/off valve
27: Exhaust manifold
28: Exhaust manifold
29: Exhaust manifold
30: Exhaust manifold
31: Coupling pipe (coupling device)
31*b*: On/off valve
31*d*: On/off valve
31*f*: On/off valve
L(n): Load factor
La: First reference value
Lb: Second reference value

The invention claimed is:

1. A supercharged internal combustion engine, comprising:
    a plurality of independent exhaust manifolds connected to a supercharger,
    a plurality of coupling pipes, wherein each of the plurality of said coupling pipes fluidly connects an end of one of the plurality of said independent exhaust manifolds to an end of another one of the plurality of said independent exhaust manifolds;
    a plurality of on/off valves wherein one of the plurality of said on/off valves is disposed in said each of the plurality of said coupling pipes, and
        wherein the one of the plurality of said on/off valves in said each of the plurality of said coupling pipes is configured to fluidly separate the plurality of said independent exhaust manifolds into an independent state;
    a branch pipe configured to fluidly connect two of the plurality of said coupling pipes such that selective operation of the one of the plurality of said on/off valves fluidly connects different combinations of two or more of the plurality of said independent exhaust manifolds;
        wherein a number of the plurality of said independent exhaust manifolds is at least three, but no more than a number equal to a number of cylinders in the supercharged internal combustion engine;
    an engine load factor, which is dependent on a rotational speed of the engine and an engine torque output, calculated by an electronic control unit; and
    a first reference engine load factor value and a second reference engine load factor value for each rotation speed of the engine stored in the electronic control unit, wherein
        when the calculated load factor is less than the first reference value, all of the plurality of said on/off valves are brought into a closed state by the electronic control unit,
        when the calculated load factor is greater than or equal to the first reference value and less than the second reference value, some of the plurality of said on/off valves are brought into an opened state by the electronic control unit, and
        when the calculated load factor is greater than or equal to the second reference value, all of the plurality of said the on/off valves are brought into an open state by the electronic control unit.

2. The supercharged internal combustion engine according to claim 1, wherein,
    when a rate of change of an amount of the engine load factor per unit time is equal to or exceeds a predetermined load factor change value stored in the electronic control unit, all of the plurality of said on/off valves are brought into a closed state, and when the rate of change of the amount of the engine load factor per unit time falls below and remains below the predetermined load factor change value for a predetermined period of time stored in the electronic control unit, the plurality of said on/off valves are opened and closed by the electronic control unit depending on the calculated load factor having been compared to at least one of the first reference value and the second reference value.

\* \* \* \* \*